(12) United States Patent
Nishiyama et al.

(10) Patent No.: US 10,996,614 B2
(45) Date of Patent: May 4, 2021

(54) PART POSITIONING MECHANISM AND IMAGE FORMING APPARATUS

(71) Applicant: CANON KABUSHIKI KAISHA, Tokyo (JP)

(72) Inventors: Tatsuo Nishiyama, Yokohama (JP); Tetsuo Furukawa, Yokohama (JP); Shigeo Murayama, Susono (JP); Kenji Ninomiya, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/628,509

(22) PCT Filed: Jul. 5, 2018

(86) PCT No.: PCT/JP2018/025560
§ 371 (c)(1),
(2) Date: Jan. 3, 2020

(87) PCT Pub. No.: WO2019/009367
PCT Pub. Date: Jan. 10, 2019

(65) Prior Publication Data
US 2020/0183320 A1   Jun. 11, 2020

(30) Foreign Application Priority Data
Jul. 7, 2017 (JP) .............................. JP2017-133461

(51) Int. Cl.
*G03G 21/16* (2006.01)
*F16B 17/00* (2006.01)
*F16B 5/00* (2006.01)

(52) U.S. Cl.
CPC ......... *G03G 21/1619* (2013.01); *F16B 17/00* (2013.01); *F16B 17/008* (2013.01); *F16B 5/0096* (2013.01)

(58) Field of Classification Search
CPC ...... F16B 17/008; F16B 5/0096; F16B 17/00; G03G 21/1619
See application file for complete search history.

(56) References Cited

U.S. PATENT DOCUMENTS 2,525,218 A * 10/1950 Glitsch .................. B01D 3/205
261/114.2
5,327,695 A    7/1994 Kelly
(Continued)

FOREIGN PATENT DOCUMENTS

JP    S57-017189 U    1/1982
JP    S61-066206 U    5/1986
(Continued)

OTHER PUBLICATIONS

International Search Report and Written Opinion issued in corresponding parent International Application No. PCT/JP2018/025560 dated Nov. 23, 2018.
(Continued)

*Primary Examiner* — Walter L Lindsay, Jr.
*Assistant Examiner* — Geoffrey T Evans
(74) *Attorney, Agent, or Firm* — Venable LLP

(57) ABSTRACT

The present invention is a part positioning mechanism configured to insert a protruding portion constituting a part of a second sheet metal part into an opening formed in a first sheet metal part. The first contact portion which contacts the first convex portion of the first sheet metal and the second contact portion which contacts the second convex portion of the first sheet metal are disposed to be shifted in an orthogonal direction which intersects orthogonally with the plate thickness direction and an insertion direction for the protruding portion. The edge of the opening of the first sheet metal part has a first edge which is distant from the protruding portion increases from the first convex portion to the second convex portion, and a second edge which is distant
(Continued)

from the protruding portion increases from the second convex portion to the first convex portion.

10 Claims, 23 Drawing Sheets

(56) References Cited

U.S. PATENT DOCUMENTS

| | | |
|---|---|---|
| 5,570,159 A | 10/1996 | Hirose et al. |
| 10,031,468 B2 * | 7/2018 | Endo .................. G03G 21/1619 |
| 10,775,733 B2 * | 9/2020 | Kobayashi ............... B41J 29/02 |

FOREIGN PATENT DOCUMENTS

| | | |
|---|---|---|
| JP | 3087815 B2 | 9/2000 |
| JP | 2008-116619 A | 5/2008 |
| JP | 2014-095844 A | 5/2014 |

OTHER PUBLICATIONS

International Preliminary Report on Patentability, dated Jan. 7, 2020, in corresponding International Application No. PCT/JP2018/025560.

* cited by examiner

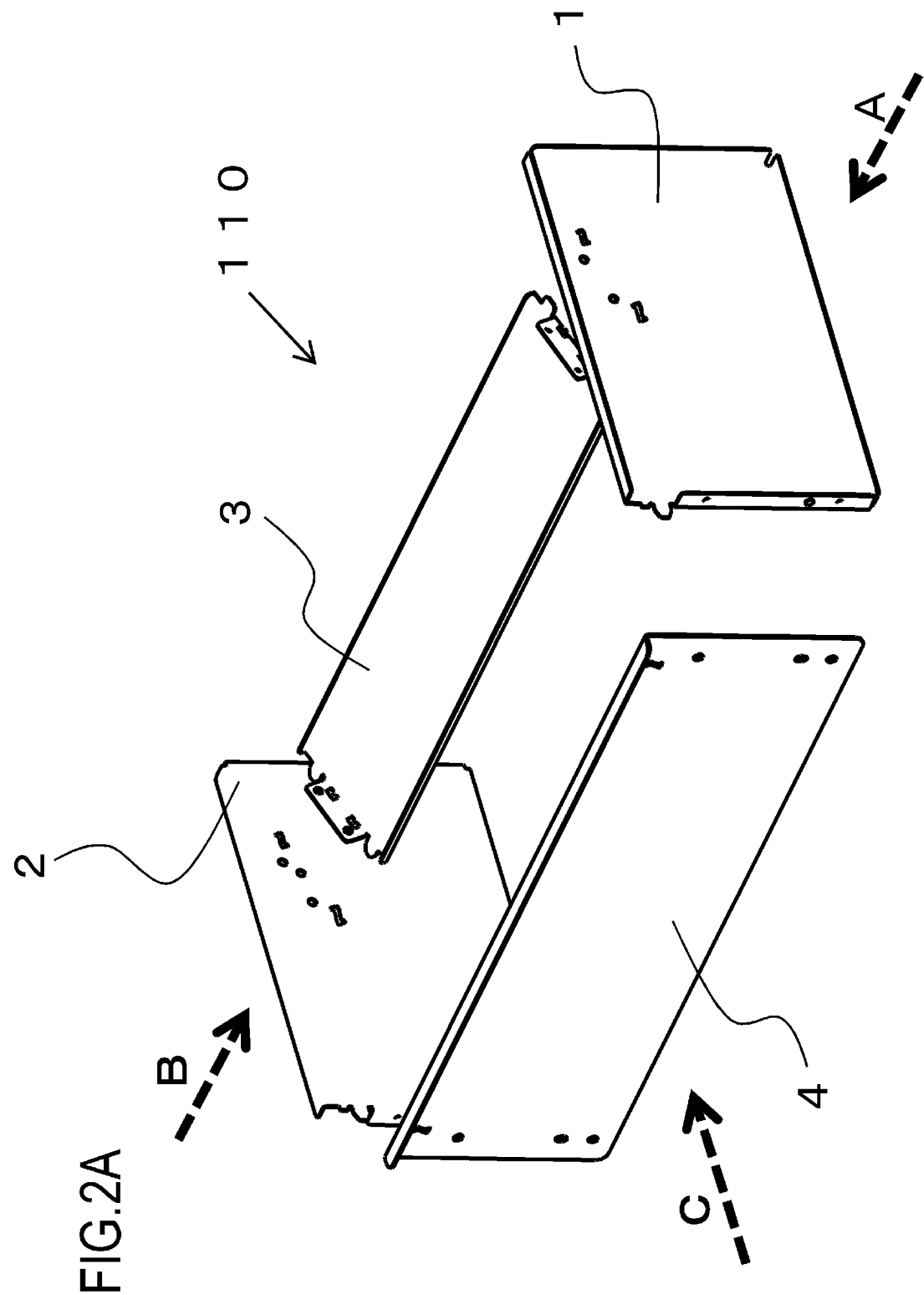

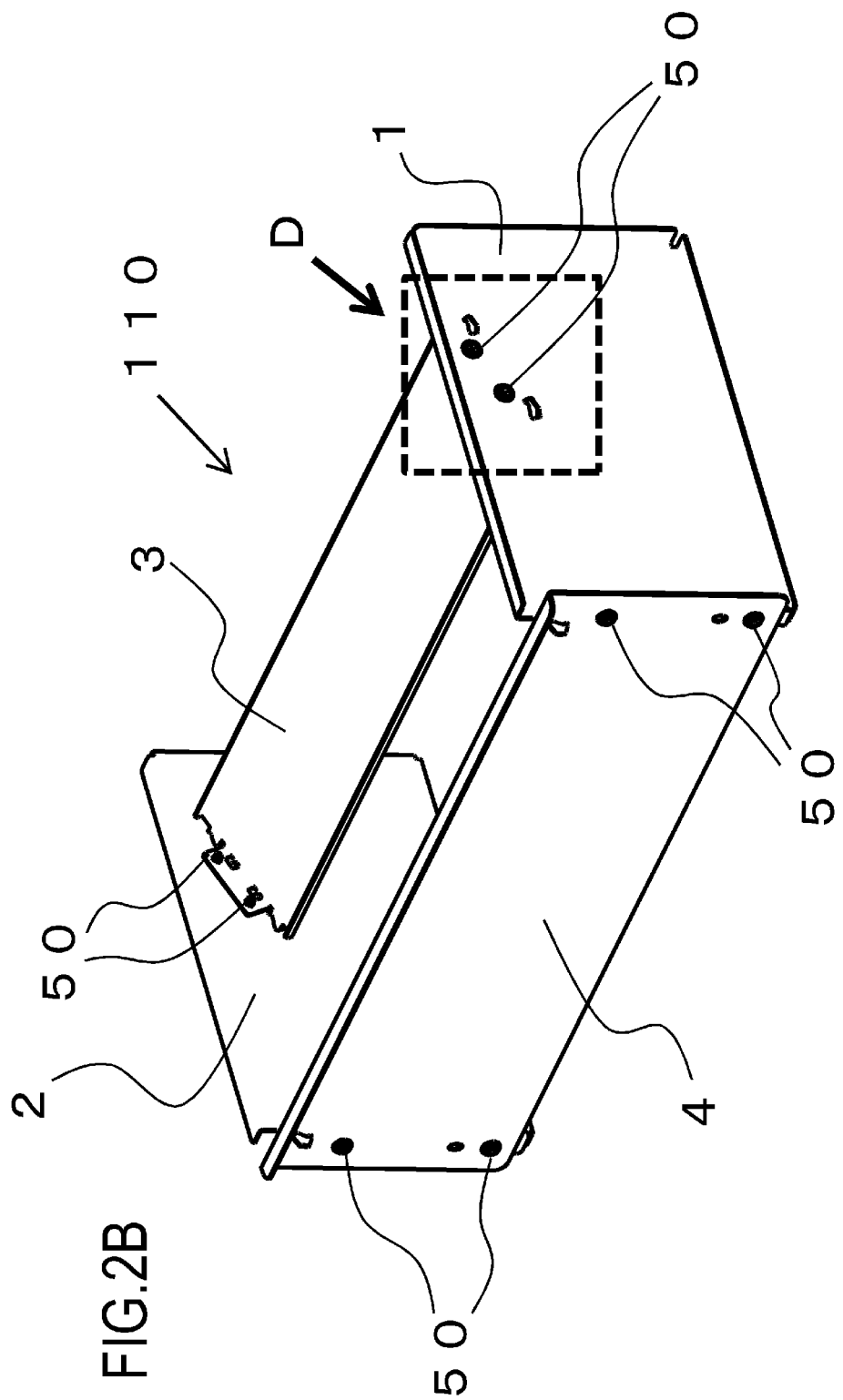

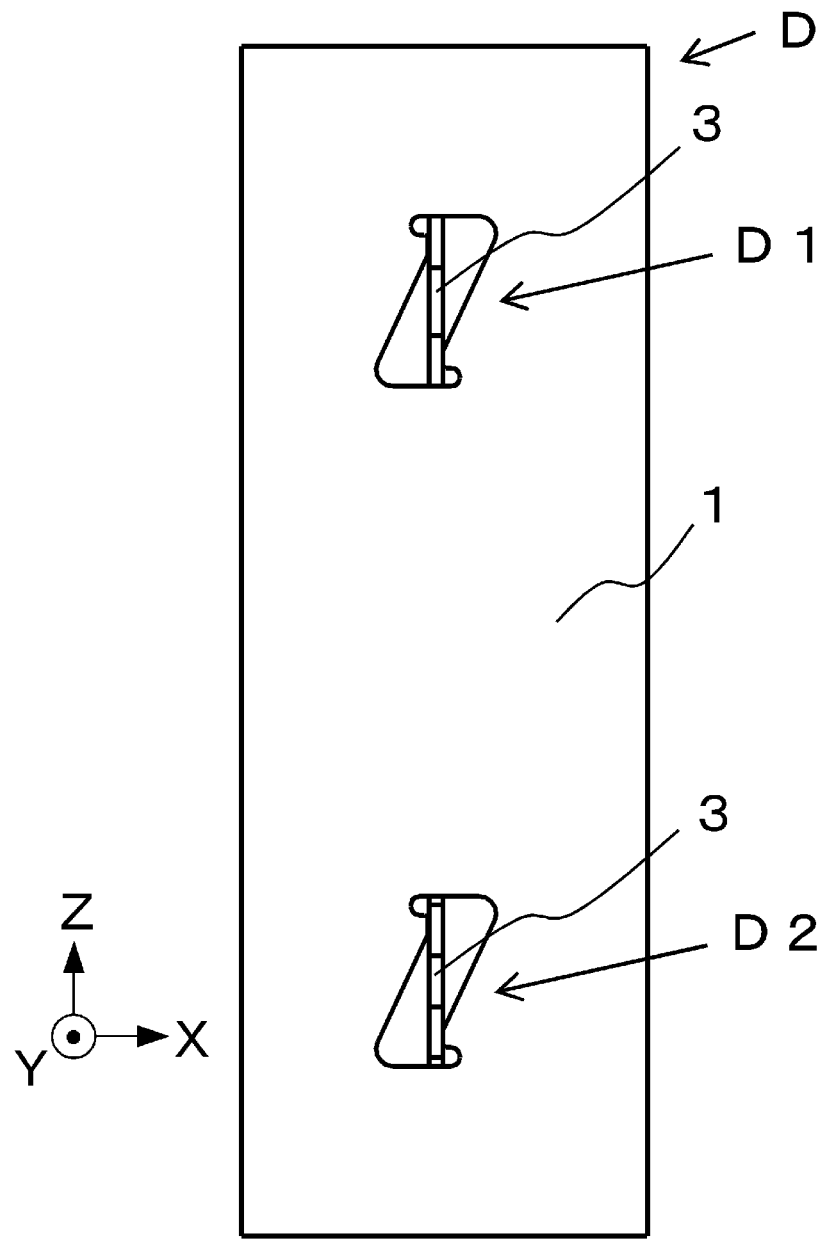

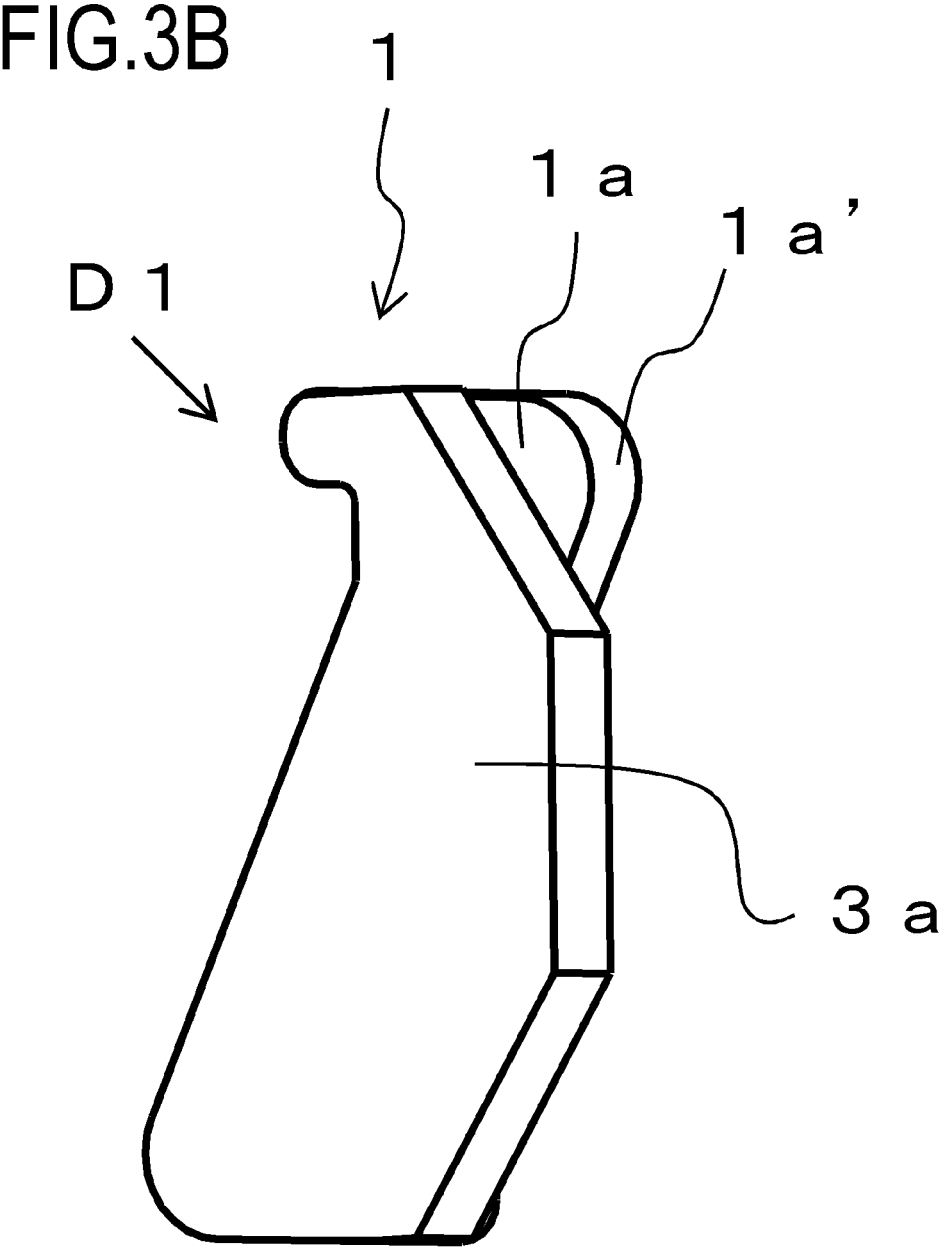

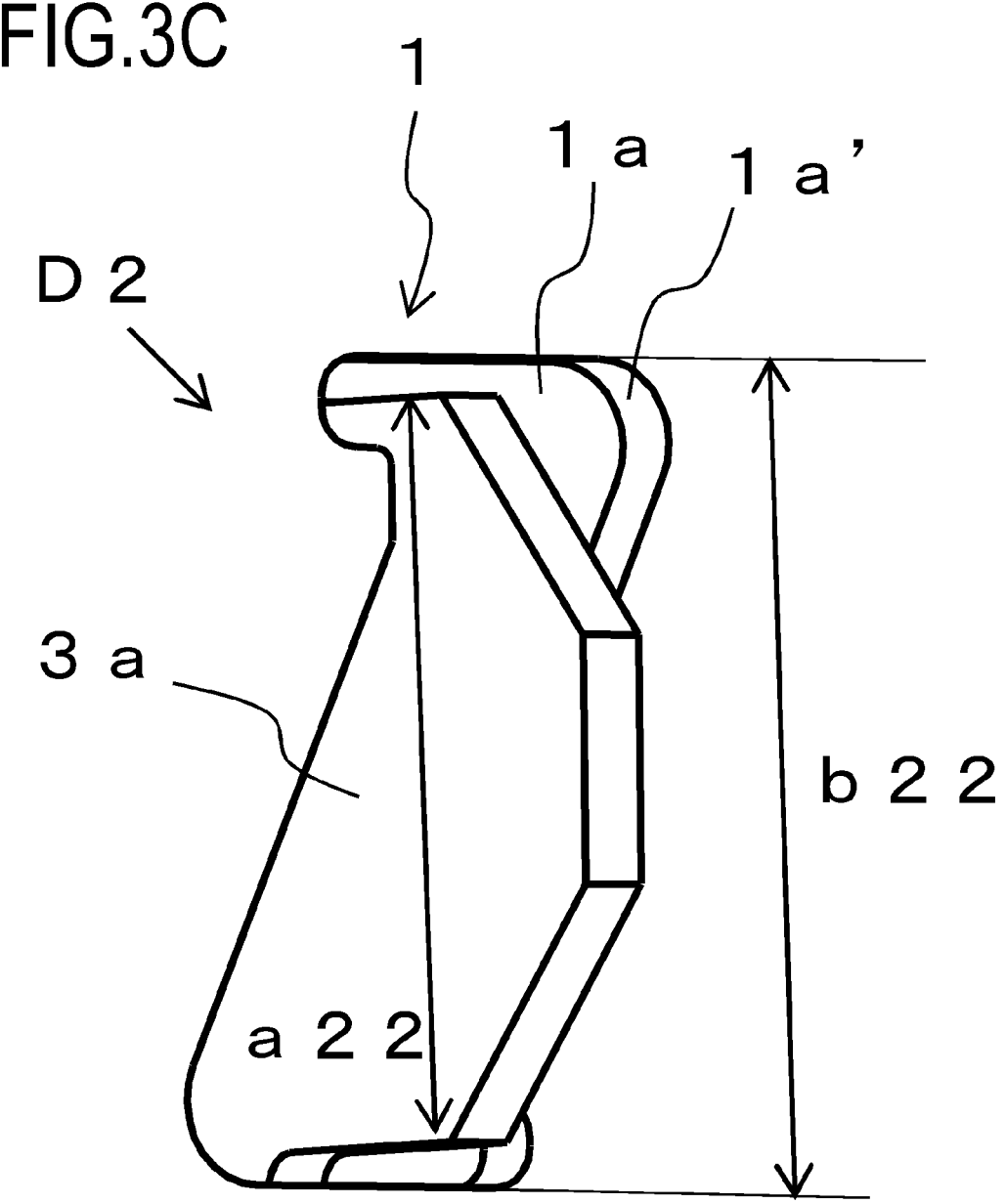

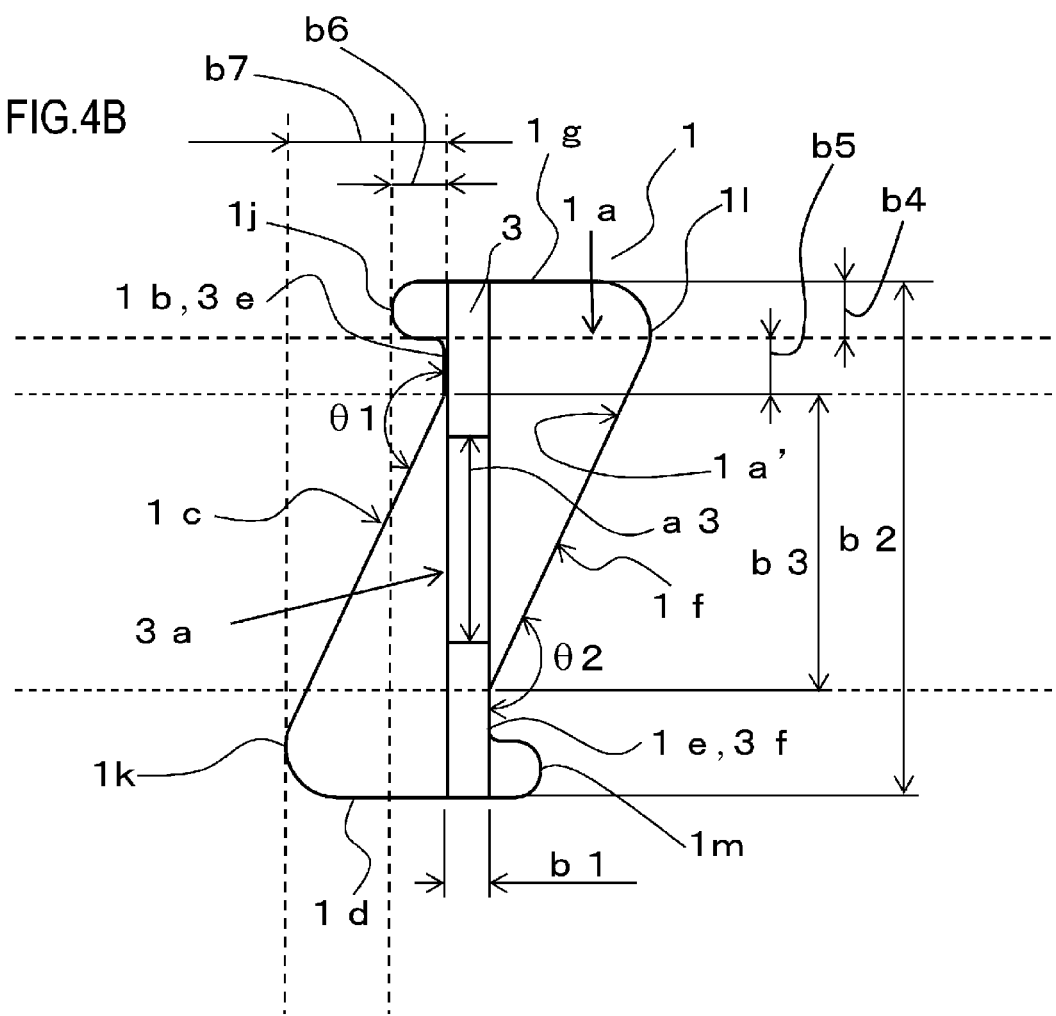

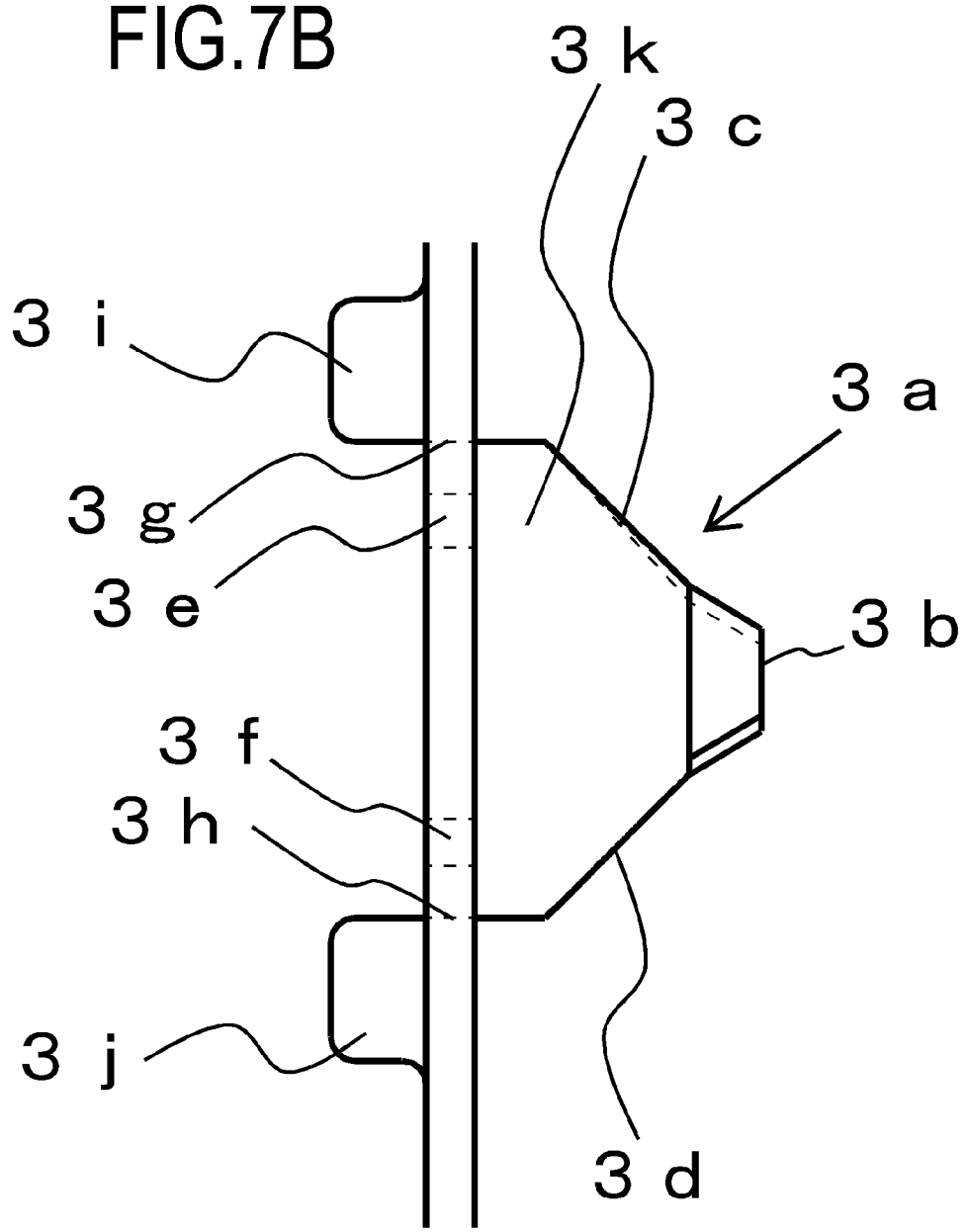

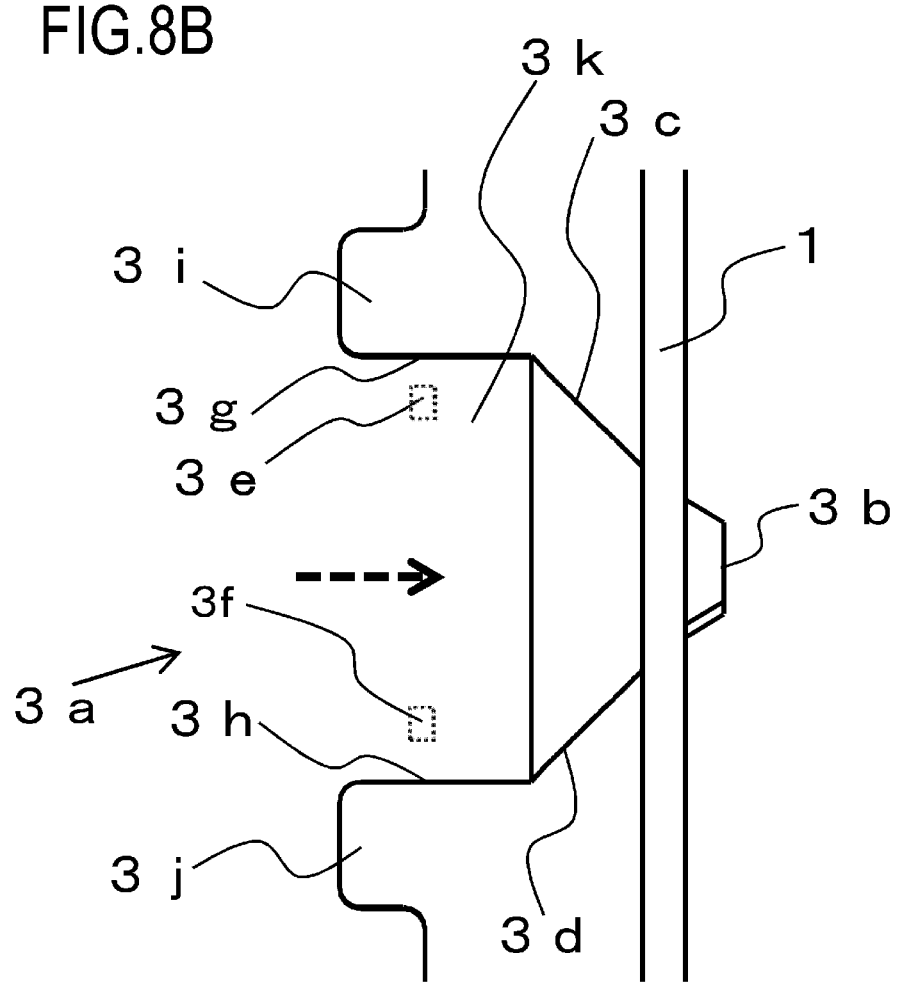

PART POSITIONING MECHANISM AND IMAGE FORMING APPARATUS

TECHNICAL FIELD

The present invention relates to a part positioning mechanism and an image forming apparatus.

BACKGROUND ART

As in a case of a main body frame of a conventional image forming apparatus such as copiers and laser beam printers, when a frame is constituted by sheet metal parts, the sheet metal parts are normally positioned.

Now an assembly of a main body frame, which is constituted by left and right side plates and sheet metal parts and molded units disposed between the left and right side plates, will be described. In the case of assembling this main body frame, the left and right side plates are temporarily held by an assembling jig at positions outside the assembly position. At this time, sheet metal parts and molded units are temporarily held by the assembling jig between the left and right side plates. Then the left and right side plates are moved inward by a slider mechanism of the assembling jig, so that the sheet metal parts and the molded units are positioned with respect to the left and right side plates and fixed to the left and right side plates by a clamp, and then tightened by screws.

For a positioning structure in such a case, a positioning structure, in which a protruding portion of one sheet metal part is inserted into a hole of the other sheet metal part so as to support the protruding portion at three points inside the hold, is known, as disclosed in the following PTL 1 and PTL 2.

CITATION LIST

Patent Literature

[PTL 1] Japanese Patent Application Publication No. 2008-116619
[PTL 2] Japanese Patent No. 3087815

SUMMARY OF INVENTION

Technical Problem

In the above-mentioned prior art, however, the sheet metal parts must be accurately aligned with each other during assembly, hence the gap between the protruding portion and the hole (hole in one side of sheet metal parts) in the plate thickness direction (plate thickness of other sheet metal part having protruding portion) is designed to be small. Therefore if the position of a sheet metal part is deviated when the part is temporarily held by the assembling jig, or if dispersion occurs to part shapes, the protruding portion may not be inserted into the hole because the sheet metal parts interfere with each other when the left and right side plates are moved inward using the assembling jig.

One solution to this problem is to bend the tip of the protruding portion, and using this bent portion as a guide for insertion. If this configuration is used, the protruding portion can be inserted into the hole without interference, even if the protruding portion deviates from the hole, but such a configuration may increase the size of the part because of the bent portion.

With the foregoing in view, it is an object of the present invention to easily perform positioning of the sheet metal parts without increasing the size of the parts.

Solution to Problem

To achieve this object, a part positioning mechanism according to the present invention is configured to position a first sheet metal part and a second sheet metal part by inserting a protruding portion constituted by a part of the second sheet metal part into an opening formed in the first sheet metal part,
wherein in a state of the protruding portion being inserted into the opening and being positioned,
the first sheet metal part has a first convex portion and a second convex portion, which protrude from an edge of the opening and position the protruding portion by sandwiching the protruding portion in a plate thickness direction, which is a direction of the plate thickness of the second sheet metal part,
the protruding portion has a first contact portion which contacts the first convex portion, and a second contact portion which contacts the second convex portion on the opposite side to the side of the first contact portion,
the first contact portion and the second contact portion are disposed with a gap in an orthogonal direction which intersects orthogonally with the plate thickness direction and an insertion direction in which the protruding portion is inserted into the opening, and
the edge of the opening has a first edge which is an edge of the opening on the side facing the first contact portion, and of which distance from the protruding portion increases in the orthogonal direction from the first convex portion to the second convex portion, and a second edge which is an edge of the opening on the side facing the second contact portion, and of which distance from the protruding portion increases in the orthogonal direction from the second convex portion to the first convex portion.

Further, to achieve this object, a part positioning mechanism according to the present invention is configured to position a first sheet metal part and a second sheet metal part by inserting a protruding portion constituted by a part of the second sheet metal part into an opening formed in the first sheet metal part,
wherein in a state of the protruding portion being inserted into the opening and being positioned,
the first sheet metal part is provided with a first convex portion and a second convex portion which protrude from an edge of the opening and position the protruding portion by sandwiching the protruding portion in a plate thickness direction, which is a direction of the plate thickness of the second sheet metal part,
the protruding portion has a first contact portion which contacts the first convex portion, and a second contact portion which contacts the second convex portion on the opposite side to the side of the first contact portion,
the first contact portion and the second contact portion are disposed with a gap in an orthogonal direction which intersects orthogonally with the plate thickness direction and an insertion direction in which the protruding portion is inserted into the opening, and
the protruding portion is positioned using only the first convex portion and the second convex portion.

Further, to achieve this object, a part positioning mechanism according to the present invention is configured to position a first sheet metal part and a second sheet metal part by inserting a protruding portion constituted by a part of the second sheet metal part into an opening formed in the first sheet metal part, wherein a first convex portion and a second convex portion are disposed facing each other on an edge of the opening, so as to position the protruding portion by sandwiching the protruding portion in a plate thickness direction, which is a direction of the plate thickness of the second sheet metal part, the protruding portion has a first contact portion and a second contact portion, the first contact portion contacting the first convex portion and the second contact portion contacting the second convex portion on the opposite side to the side of the first contact portion, when insertion into the opening completes and the first sheet metal part and the second sheet metal part are positioned, and the first concave portion and the second concave portion are disposed on the edge of the opening to be shifted from each other in an orthogonal direction which intersects orthogonally with the plate thickness direction and an insertion direction in which the protruding portion is inserted into the opening, so that movement of the first contact portion in a direction of departing from the first convex portion and movement of the second contact portion in a direction of departing from the second convex portion are allowed in a state of the protruding portion being inserted into the opening and being in progress to complete of the insertion.

Furthermore, an image forming apparatus according to the present invention includes the above-mentioned the part positioning mechanism and a frame in which a plurality of sheet metal parts are positioned by the part positioning mechanism.

Advantageous Effects of Invention

According to the present invention, positioning of the sheet metal parts can be easily performed without increasing the size of the parts.

Further features of the present invention will become apparent from the following description of exemplary embodiments with reference to the attached drawings.

BRIEF DESCRIPTION OF DRAWINGS

FIG. 2A shows diagrams depicting the configuration of the main body frame of the image forming apparatus in the state before assembling the main body frame according to Example 1.

FIG. 2B shows diagrams depicting the configuration of the main body frame of the image forming apparatus in the state after assembling the main body frame according to Example 1

FIG. 3A shows diagrams depicting a stay member according to Example 1.

FIG. 3B shows an enlarged perspective view of a D1 portion illustrated in FIG. 3A.

FIG. 3C shows an enlarged perspective view of a D2 portion illustrated in FIG. 3A.

FIG. 4B shows diagrams depicting a hole which is an opening formed in the left side plate according to Example 1.

FIG. 7B shows a left side view of D1 portion illustrated in FIG. 7A.

FIG. 8B shows a left side view of FIG. 8A.

DESCRIPTION OF EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Example 1

Example 1 will be described below. In this example, an image forming apparatus having a positioning mechanism according to this example and a main body frame, which is a frame in which sheet metal parts are positioned using this positioning mechanism, will be described with reference to FIGS. 1 to 6.

<General Configuration of Image Forming Apparatus>

A general configuration of an image forming apparatus 100 of this example will be described first with reference to FIG. 1.

Figure 1:
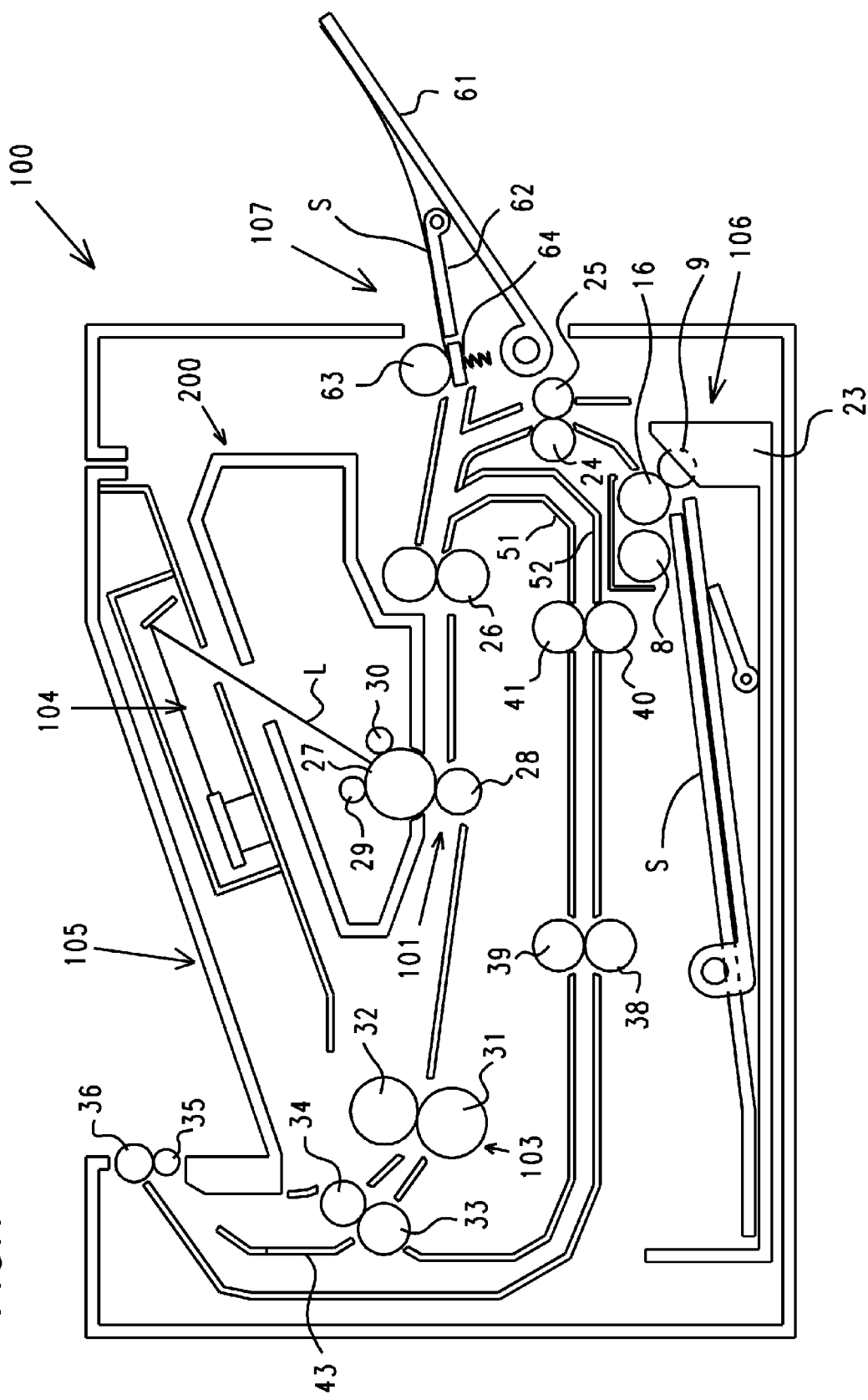
FIG. 1 is a schematic cross-sectional view depicting an image forming apparatus according to Example 1.

FIG. 1 is a schematic cross-sectional view of the image forming apparatus 100 of this example.

The image forming apparatus 100 roughly includes a sheet feeding apparatus 106 configured to supply sheet S (sheet material, recording material), an image forming unit 101 configured to transfer a toner image to the supplied sheet S, and a fixing unit 103 configured to fix the transferred toner image onto the sheet S.

The sheet feeding apparatus 106 includes a cassette 23 which stores the sheet S, a pick-up roller 8 which feeds the sheet S stored in the cassette 23, a feed roller 16 which transports the fed sheet S to a transport roller pair 24 and 25, and a separation roller 9 which faces the feed roller 16. The sheet S is frictionally separated by the torque that is set in a torque limiter (not illustrated) which is coaxially included in the separation roller 9.

When a control unit (not illustrated) transmits a print signal, the pick-up roller 8 and the feed roller 16 rotate counterclockwise only during feeding, whereby the sheet S stored in the cassette 23 is fed toward the image forming unit 101.

The image forming unit 101 includes a cartridge 200 which is detachable from the apparatus main body of the image forming apparatus 100, a transfer roller 28, and a laser scanner unit (light irradiating unit) 104. The cartridge 200 includes a photo-sensitive drum 27, a charging device 29, and a developing device 30.

The surface of the photosensitive drum 27 is charged by the charging device 29. When the laser light L is emitted by the laser scanner unit 104, the laser light L is irradiated to the photosensitive drum 27. Thereby a latent image is formed on the surface of the photosensitive drum 27. A toner image is formed on the photosensitive drum 27 when this latent image is developed by the developing device 30. The toner image formed on the photosensitive drum 27 is transferred to the sheet S, which is fed into a transfer nip portion, formed between the photosensitive drum 27 and the transfer roller 28, by the transport roller 26.

The sheet S, on which the toner image is transferred, is sent to the fixing unit 103, and is heated and pressed at a fixing nip portion formed by a heating roller 32 and a pressing roller 31 of the fixing unit 103, whereby the toner image on the sheet S is fixed to the sheet S. The sheet S, which passed through the fixing unit 103, is transported by a transport roller pair 33 and 34 and a discharge roller pair 35 and 36, and is discharged onto a paper delivery tray 105.

To print the second surface, the discharge roller 36 is rotated in reverse after the first surface of the sheet S passes through the fixing unit 103 and is transported by the discharge roller pair 35 and 36, and the rear end of the sheet S passes through a transport guide 43, so that the sheet S is transported to a double-sided path.

Further, the sheet S is transported by a first double-sided transport roller pair 38 and 39, is transported by a second double-sided roller pair 40 and 41 and transport paths 51 and 52, and reaches the transport roller 26 again, so as to be fed into the nip portion between the photosensitive drum 27 and the transfer roller 28. Thereby the toner image is transferred to the second surface of the sheet S.

The sheet S, on which the toner image is transferred, is sent to the fixing unit 103, and a toner image is fixed to the second surface of the sheet S by heat and pressure, and is then discharged onto the paper delivery tray 105 by the discharge roller pair 35 and 36.

A multi-feeding unit 107 includes a multi-tray 61 which stores the sheet S, a multi-intermediate plate 62, a multi-feeding roller 63, and a separation pad 64. When a control unit (not illustrated) transmits a print signal, the multi-feeding roller 63 rotates clockwise only during feeding, whereby the sheet S stored in the multi-tray 61 is fed toward the image forming unit 101.

<Description on Main Body Frame>

The configuration of the main body frame 110 of the image forming apparatus 100 of this example will be described next.

FIGS. 2A and 2B are diagrams depicting the configuration of the main body frame 110 of the image forming apparatus 100, where FIG. 2A shows the state before assembling the main body frame 110, and FIG. 2B shows the state after assembling the main body frame 110.

As illustrated in FIG. 2A, the main body frame 110 of the image forming apparatus 100 is constituted by the following four sheet metal parts. In other words, the main body frame 110 is constituted by a left side plate 1 and a right side plate 2 (these may be referred to as the left and right side plates 1 and 2), which are disposed facing each other, and a stay member 3 and a stay member 4, which are supported by the left and right side plates 1 and 2. The left and right side plates 1 and 2 are disposed vertically with respect to an installation surface on which the image forming apparatus 100 is installed. The stay member 3 is supported by the left and right side plates 1 and 2 in a state slightly inclined with respect to the installation surface, and the stay member 4 is supported by the left and right side plates 1 and 2 in an approximate vertical state. The stay member 4 is supported by the left and right side plates 1 and 2 on the rear surface side (rear surface side of the image forming apparatus 100).

The laser scanner unit 104 is installed on the stay member 3.

The feeding unit constituted by molded parts and the transport unit are also positioned and fixed to the left and right side plates 1 and 2, although these units are not illustrated in FIGS. 2A and 2B.

When the main body frame 110 is assembled, the left and right side plates 1 and 2 are temporarily held by an assembling jig (not illustrated), as illustrated in FIG. 2A, and the stay member 3, disposed between the left and right side plates 1 and 2, is also temporarily held by the assembling jig (not illustrated).

Then the left and right side plates 1 and 2 are moved in the arrows A and B directions, as indicated in FIG. 2A, respectively by a slider mechanism of the assembling jig (not illustrated), and the stay member 4 is also moved in the arrow C direction indicated in FIG. 2A, whereby the stay members 3 and 4 are positioned and fixed respectively with respect to the left and right side plates 1 and 2. At this time, the stay members 3 and 4 are fixed to the left and right side plates 1 and 2 by a clamp, and are then tightened by screws 50.

<Positioning Mechanism>

A part positioning mechanism that is used for the left side plate 1 (first sheet metal part) and the stay member 3 (second sheet metal part), when the main body frame 110 of the image forming apparatus 100 is assembled, will be described next.

FIG. 3A is an enlarged view of the D portion in FIG. 2B, when the stay member 3 is inclined. The screws 50 are omitted here to make description simpler. The D portion includes a portion where the left side plate 1 and the stay member 3 are positioned and fixed.

To make description simpler, it is defined that the Z direction, indicated in FIG. 3A, is the longitudinal (vertical) direction, and the X direction is the plate thickness (horizontal) direction of the stay member 3. It is also defined that the Y direction is the insertion direction to insert the stay member 3 into a later mentioned hole 1a (corresponding to an opening) formed in the left side plate 1. This Y direction is the opposite direction to the arrow A direction (same direction as the arrow B direction) indicated in FIG. 2A. The longitudinal direction is a direction intersecting orthogonally with the insertion direction and the plate thickness direction.

FIG. 3B is an enlarged view of a D1 portion illustrated in FIG. 3A. As illustrated in FIG. 3B, the D1 portion is a positioning portion where the left side plate 1 and the stay member 3 are positioned with respect to both the longitudinal direction and the plate thickness direction. The sizes of the hole 1a and the protruding portion 3a are approximately the same in the longitudinal direction.

FIG. 3C is an enlarged view of a D2 portion illustrated in FIG. 3A. As illustrated in FIG. 3C, the D2 portion is a positioning portion where the left side plate 1 and the stay member 3 are positioned with respect to the plate thickness direction. In the D2 portion, there is a 1 mm gap between the left side plate 1 and the stay member 3 in the longitudinal direction.

<Protruding Portion>

Figure 4A:
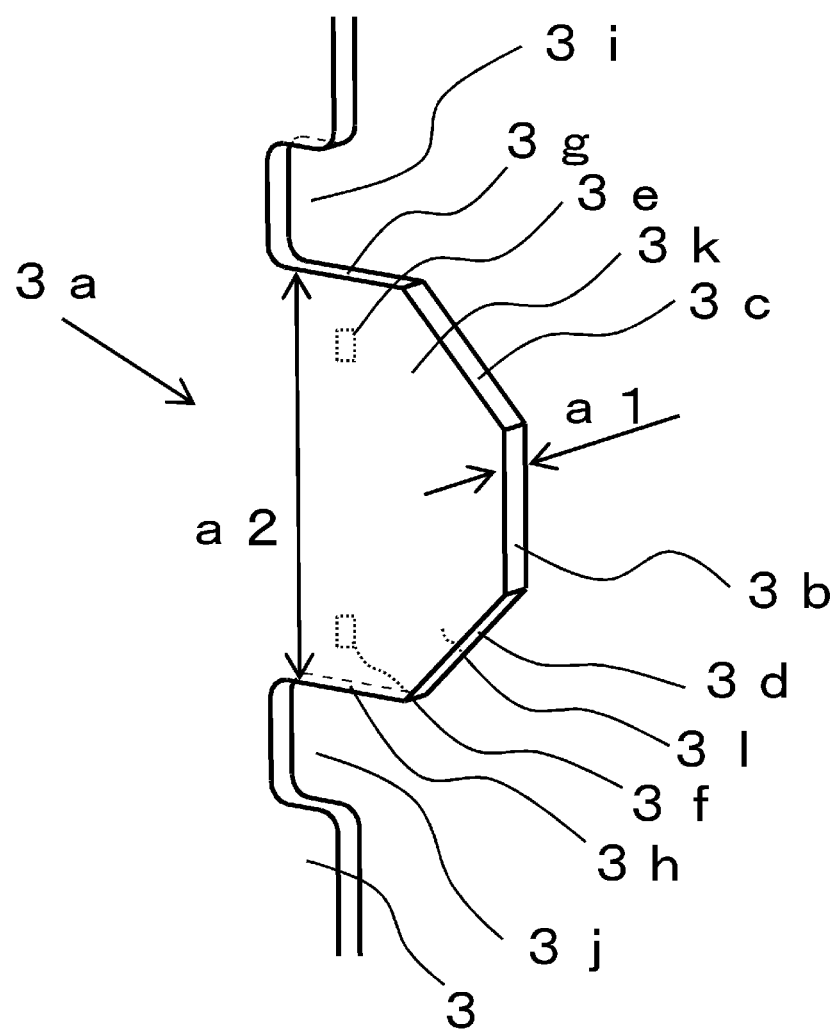
FIG. 4A shows diagrams depicting a protruding portion disposed at the tip of the stay member in the insertion direction according to Example 1.

FIG. 4A is a diagram depicting a protruding portion 3a disposed at the tip of the stay member 3 in the insertion direction. The protruding portion 3a is constituted by a part of the stay member 3. As illustrated in FIG. 4A, the plate thickness of the stay member 3 is a1, and the length of the protruding portion 3a in the longitudinal direction is a2.

In the protruding portion 3a, a tip portion 3b, which is the tip in the insertion direction, tapers 3c and 3d, a first contact portion 3e on the protruding portion 3a side (protruding side first contact portion), a second contact portion 3f (protruding portion side second contact portion), interfitting portions 3g and 3h, and notches 3i and 3j, are formed. In this example, one of the surface of the protruding portion 3a, on which the first contact portion 3e is formed, is assumed to be a surface 3k, and the other surface, on which the second contact portion 3f is formed, is assumed to be a surface 31. In FIG. 4A, portions corresponding to the first contact portion 3e and the second contact portion 3f on the protruding portion 3a are indicated by the dotted lines.

Here the first contact portion 3e and the second contact portion 3f correspond to the positioning locations with the left side plate 1, and the tapers 3c and 3d correspond to the inclined sides which incline from the first contact portion 3e and the second contact portion 3f toward the tip 3b such that the width in the longitudinal direction gradually decreases. The width of the protruding portion 3a in the longitudinal direction is narrower at the tip 3b than the first contact portion 3e or the second contact portion 3f.

The tapers 3c and 3d are formed so as to be guided by the later mentioned sides 1c and if disposed in a later mentioned hole 1a, when the protruding portion 3a is inserted into the hole 1a.

The notches 3i and 3j are formed at the base of the protruding portion 3a. The notches 3i and 3j are clearances for inserting the protruding portion 3a into the bottom of the hole 1a and positioning the protruding portion 3a.

<Hole>

FIG. 4B is a diagram depicting a hole 1a which is an opening formed in the left side plate 1. As illustrated in FIG. 4B, the hole 1a, which has an approximately Z shape and is interfitted with the protruding portion 3a, is formed in the left side plate 1. In this example, the approximately Z-shaped hole 1a is formed at the edge of the opening including the sides 1b to 1g, as illustrated in FIG. 4B. Further, an edge is formed as an inner wall constituting the hole 1a (opening), and this edge is assumed to be 1a'. The hole 1a (opening) and the edge 1a' are formed not only in the D1 portion, but also in the D2 portion, as illustrated in FIGS. 3B and 3C.

In this example, the side 1b and the side 1e are disposed shifted from each other in the longitudinal direction, that is, disposed with a distance from each other. The distance b3 between side 1b and side 1e in the longitudinal direction is longer than the width a3 of the tip 3b in the longitudinal direction.

As described in detail later, when the protruding portion 3a of the stay member 3 is inserted into the hole 1a of the left side plate 1, the side 1b contacts the first contact portion 3e of the protruding portion 3a, and the side 1e contacts the second contact portion 3f of the protruding portion 3a, whereby the left side plate 1 and the stay member 3 are positioned.

Here the side 1b corresponds to a contact portion which contacts the first contact portion 3e (opening side first contact portion), and the side 1e corresponds to a contact portion which contacts the second contact portion 3f (opening side second contact portion). The side 1g corresponds to one edge side of the hole 1a in the longitudinal direction, and the side 1d corresponds to the other edge side of the hole 1a in the longitudinal direction. In this example, the side 1b is disposed on the side 1g side (the one edge side) in the longitudinal direction, with respect to the side 1e. Further, as divided by the dotted lines in FIG. 4B, the side 1c in the portion of the edge 1a' corresponding to the above-mentioned space b3 corresponds to a first inclined side, which inclines in the direction gradually departing from the surface 3k from the side 1b to the side 1d. In the same manner, the side 1f, which is divided by dotted lines and is disposed at a position facing the side 1c, corresponds to a second inclined side, which inclines in the direction gradually departing from the surface 31 from the side 1e to the side 1g. The sides 1b and 1c protrude from the edge 1a' in the plate thickness direction, so as to form a first convex portion, and the sides 1e and 1f form a second convex portion, which faces the first convex portion in the plate thickness direction, or on the opposite side to the first convex portion sandwiching the protruding portion 3a. The portion of the edge 1a', which is formed so that the distance from the protruding portion 3a increases from the first convex portion to the second convex portion in the longitudinal direction, corresponds to the first edge. The portion which is formed so that the distance from the protruding portion 3a increases from the second convex portion to the first convex portion corresponds to the second edge.

Now the dimensions of each section illustrated in FIG. 4B will be described. The width b1 is a space (distance) between a vertical line including the side 1b and a vertical line including the side 1e, and the dimension b2 of the hole 1a in the longitudinal direction is a distance between the side 1d and the side 1g, which extend in the plate thickness direction respectively. The dimension of the width b1 of the hole 1a is the same as the plate thickness a1 of the protruding portion 3a, and the dimension b2 of the hole 1a in the longitudinal direction is the same as the dimension a2 of the protruding portion 3a in the longitudinal direction. The dimension b3 is a distance between the side 1b and the side 1e, as mentioned above. To be more precise, the dimension b3 is a distance from the boundary between the side 1b and the first inclined side 1c to the boundary between the side 1e and the second inclined side 1f. The dimension b4 is a distance from the side 1g to the edge of the side 1b on the side 1g side. The dimension b5 is approximately the same as the length of the side 1b, and the side 1b and the side 1e are both the same lengths, that is, the dimension b5. The dimension b5 can also be defined as the distance between: a concave portion having a shallower depth in the plate thickness direction, out of the two concave portions sandwiching the above-mentioned first convex portion when viewed in the longitudinal direction; and the portion where the side 1b is changed to the above-mentioned first inclined side 1c. The dimension b6 is a distance between: the vertical line including the side 1b; and a base 1j of the concave portion having a shallower depth in the plate thickness direction, out of the two concave portions sandwiching the above-mentioned first convex portion when viewed in the longitudinal direction. The dimension b7 is a distance between: the vertical line including the side 1b; and a base 1k of the concave portion having a deeper depth in the plate thickness direction, out of the above-mentioned two concave portions. In other words, the dimension b7 is a distance between the vertical line including the side 1b and a portion of the first edge that is the most distant from the surface 3k. The shape of the hole 1a is approximately a point-symmetric Z shape, hence the distance between each section of the edge on the side facing the other surface 31 of the protruding portion 3a can be interpreted as above respectively. For example, the distance between: the vertical line including the side 1e; and a base 1m of the concave portion having a shallower depth in the plate thickness direction, out of the two concave portions sandwiching the second convex portion when viewed in the longitudinal direction is the same as the length of b6. Further, the distance between: the vertical line including the side 1e; and a base 11 of the concave portion having a deeper depth in the plate thickness direction, out of the two concave portions is the same as the length of b7.

When the protruding portion 3a of the stay member 3 is inserted into the hole 1a of the left side plate 1, the side 1b and the contact portion 3e contact, and the side 1e and the contact portion 3f contact. In this manner, the hole 1a and the protruding portion 3a interfit in the state of sandwiching the protruding portion 3a by the side 1b and the side 1e, whereby the left side plate 1 and the stay member 3 are positioned in the plate thickness direction.

At this time, both ends of the protruding portion 3a in the longitudinal direction are fitted between the side 1d and the side 1g, and the left side plate 1 and the stay member 3 are positioned in the longitudinal direction. In the state of the protruding portion 3a fitted between the side 1d and the side 1g, the side 1g and an interfitting portion 3g are contacted, and the side 1d and an interfitting portion 3h are contacted.

In this example, it is assumed that the angle θ1, between the side 1b and the side 1c illustrated in FIG. 4B, is 180° or less, and the angle θ2, between the side 1e and the side 1f, is also 180° or less. In FIG. 4B, θ1=θ2=155°, but θ1 and θ2 need not always be the same angles.

As illustrated in FIG. 3C, in the D2 portion, the dimension b22 of the hole 1a in the longitudinal direction is set to be larger than the dimension a22 of the protruding portion 3a in the longitudinal direction, and a clearance is formed between the protruding portion 3a and the hole 1a in the longitudinal direction.

Thereby in the D2 portion, the left side plate 1 and the stay member 3 are positioned only in the plate thickness direction. In other words, in the D2 portion, positioning is performed only at the first convex portion and the second convex portion.

<Positioning Operation>

An operation of positioning and assembling the left side plate 1 and the stay member 3 by inserting the protruding portion 3a into the hole 1a will be described with reference to FIGS. 5A to 5C.

Figure 5A:
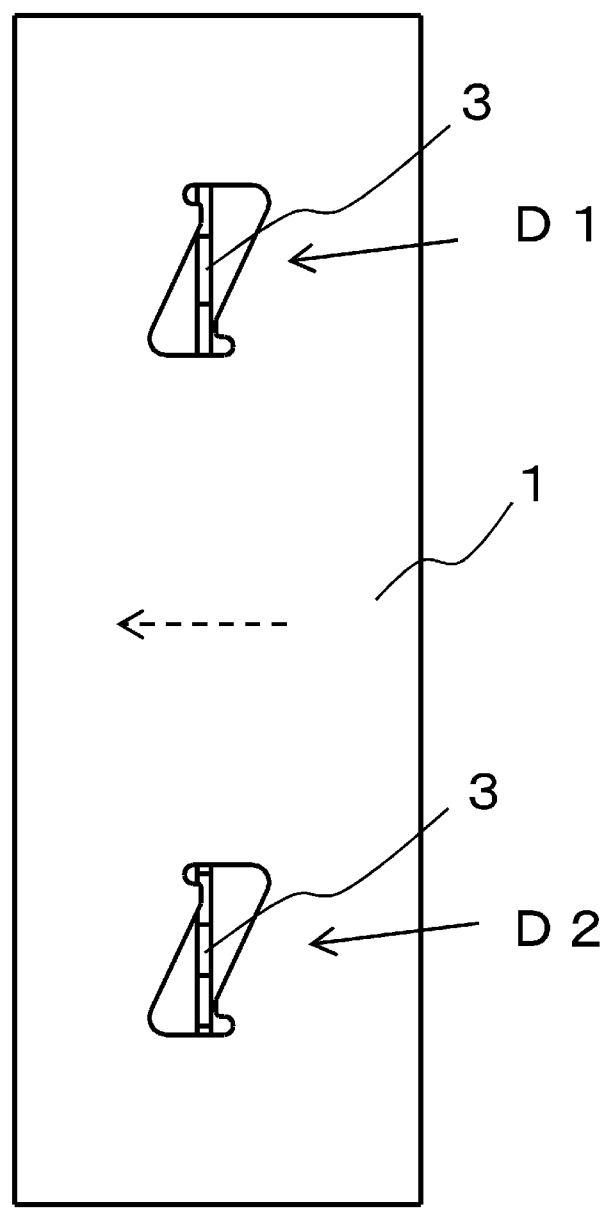
FIG. 5A shows diagrams depicting the D1 portion and the D2 portion in the positioning operation according to Example 1.
Figure 5B:
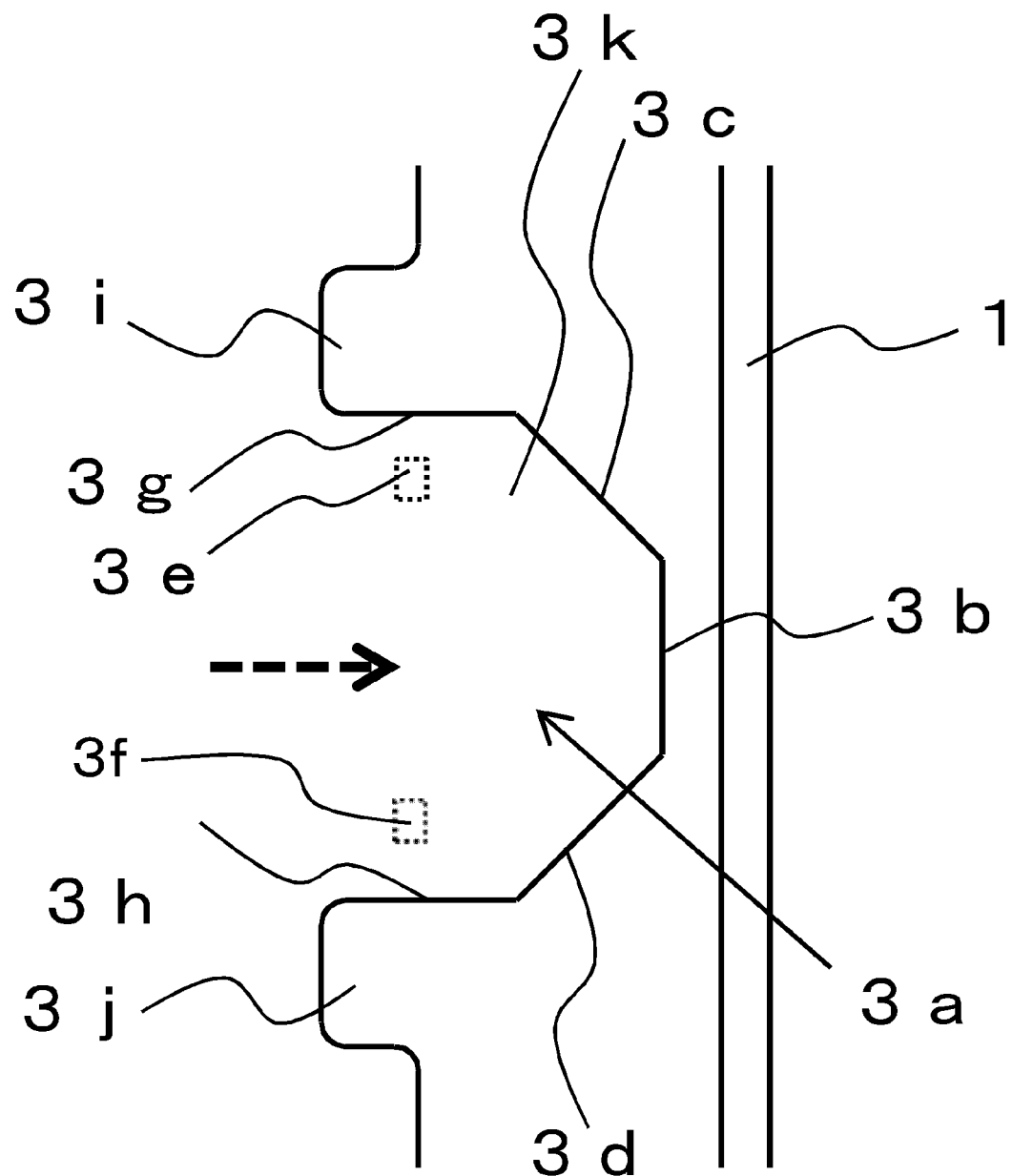
FIG. 5B shows a left side view of FIG. 5A.
Figure 5C:
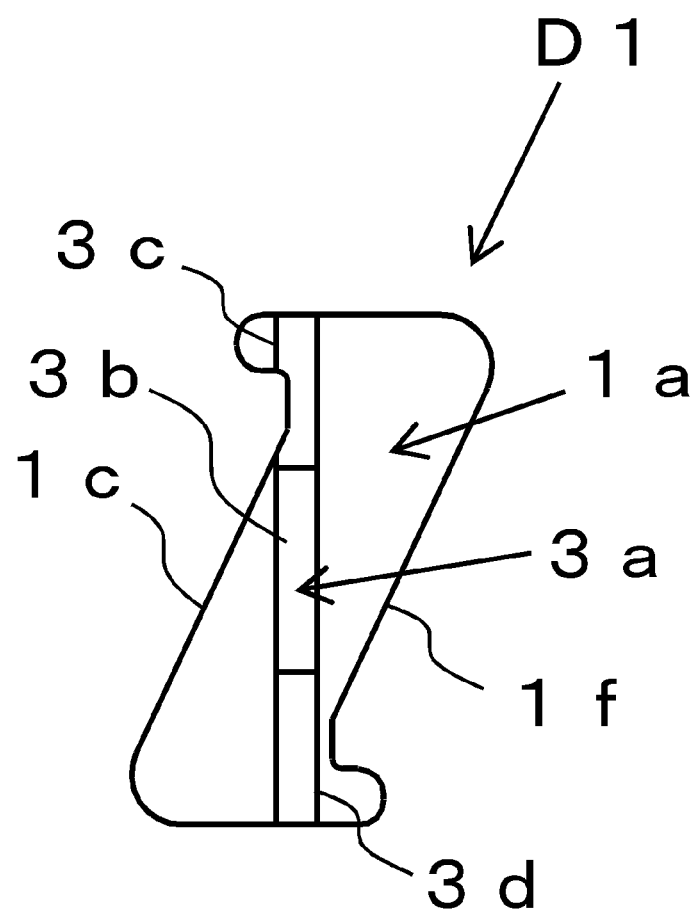
FIG. 5C shows an enlarged view of D1 portion illustrated in FIG. 5A.

FIG. 5A is a diagram depicting the D1 portion and the D2 portion, FIG. 5B is a left side view of FIG. 5A, and FIG. 5C is an enlarged view of the D1 portion.

In some cases, the positions of the stay member 3 which is temporarily held by the assembly jig may be different between the D1 portion and the D2 portion, because of the dispersion of the part dimensions and the installation looseness.

In such a case, the protruding portion 3a may be inserted into the hole 1a in the D1 portion or the D2 portion in the state of deviating from the hole 1a to the left (arrow direction indicated in FIG. 5A) in the plate thickness direction, for example, as illustrated in FIG. 5A.

An operation to position the left side plate 1 and the stay member 3 in such a state will be described next. In the following description, a case of the D1 portion will be described, but the same positioning operation can be performed in the deviated state also in the D2 portion, as in the D1 portion, hence description on the D2 portion will be omitted.

First in the state where the left side plate 1 and the stay member 3 are separated, as illustrated in FIG. 5B, the protruding portion 3a is moved in the arrow direction, as indicated in FIG. 5B. Then if the protruding portion 3a moves and is about to enter the hole 1a, as illustrated in FIG. 5C, the protruding portion 3a is interrupted by the side 1b of the hole 1a, and cannot be inserted because the protruding portion 3a is deviated from the hole 1a to the left in the plate thickness direction. Therefore the protruding portion 3a in the state of FIG. 5C is inclined clockwise by a predetermined angle, and the tip of the protruding portion 3a is inserted into the hole 1a in this state. Then the side 3c, which is inclined such that the width in the longitudinal direction from the positioning location of the protruding portion 3a and the left side plate 1 to the tip of the protruding portion 3a gradually decreases, contacts with the above-mentioned first edge including the side 1c of the hole 1a.

If the protruding portion 3a is further inserted into the hole 1a in this state, the portion corresponding to the side 1c of the first edge plays the role of the directional guide to the positioning location, whereby the side 3c is guided to the positioned state along the side 1c. The portion which plays the role of a directional guide to the positioning location is not limited to the side 1c. For example, out of the above-mentioned two concave portions which sandwich the first convex portion when viewed in the longitudinal direction, the rounded portion of the concave portion, of which depth in the plate thickness direction is deeper, could be the directional guide to the positioning location. In this case, the D2 portion is also guided to the positioned state in the same manner.

The same assembly can be used in the case when the protruding portion 3a is inserted in the state of deviating from the hole 1a to the right in the plate thickness direction. In other words, the protruding portion 3a is inclined counterclockwise by a predetermined angle, and the tip of the protruding portion 3a is inserted into the hole 1a in this state. Then the side 3d, which is the inclined side forming a pair with the above-mentioned side 3c, contacts the above-mentioned second edge including the side 1f of the hole 1a. If the protruding portion 3a is further inserted into the hole 1a in this state, the portion corresponding to the side if of the second edge plays the role of the directional guide to the positioning location as in the above-mentioned case, whereby the side 3d is guided to the positioned state along the side 1f. The D2 portion is also guided to the positioned state at this time.

The protruding portion 3a can be inserted into the hole 1a if it is inclined by a predetermined angle for the following reason. The hole 1a has an approximately Z shape which provides some room in the diagonal direction when viewed in the insertion direction for the protruding portion 3a, and an area (space) sufficient enough to incline the protruding portion 3a is created in an area of the hole 1a where the protruding portion 3a passes.

Therefore even if the D1 portion and the D2 portion deviated in the plate thickness direction during assembly, the protruding portion 3a can be guided by the side 1c or the side 1f and positioned, only if the tip 3b of the protruding portion 3a does not deviate from the hole 1a in the D1 portion and the D2 portion.

As described above, in the part positioning mechanism of this example, the above-mentioned configuration is used to insert the protruding portion 3a into the hole 1a. Thereby even if the position of the stay member 3, which is temporarily held by the assembling jig, deviates when two sheet metal parts are positioned, due to the dispersion of the dimensions of the parts and installation looseness, the two sheet metal parts can be easily positioned.

As a result, the sheet metal parts can be positioned easily without increasing the size of the parts.

In this example, two sheet metal parts are positioned using the D1 portion and the D2 portion, as mentioned above.

If the left side plate 1 and the stay member 3 are positioned at one location, the stay member 3 may be rotated with respect to the left side plate 1. By performing positioning at two locations of the D1 portion and the D2 portion, as in this example, the left side plate 1 and the stay member 3 can be positioned and assembled more accurately.

In this example, the two sheet metal parts are positioned with each other at two locations of the D1 portion and the D2 portion, but the present invention is not limited to this, and the positioning mechanism at the D1 portion or the D2 portion may be used only for one of a plurality of locations.

FIGS. 6A to 6D are diagrams depicting another example of positioning two sheet metal parts at a plurality of locations.

Figure 6A:
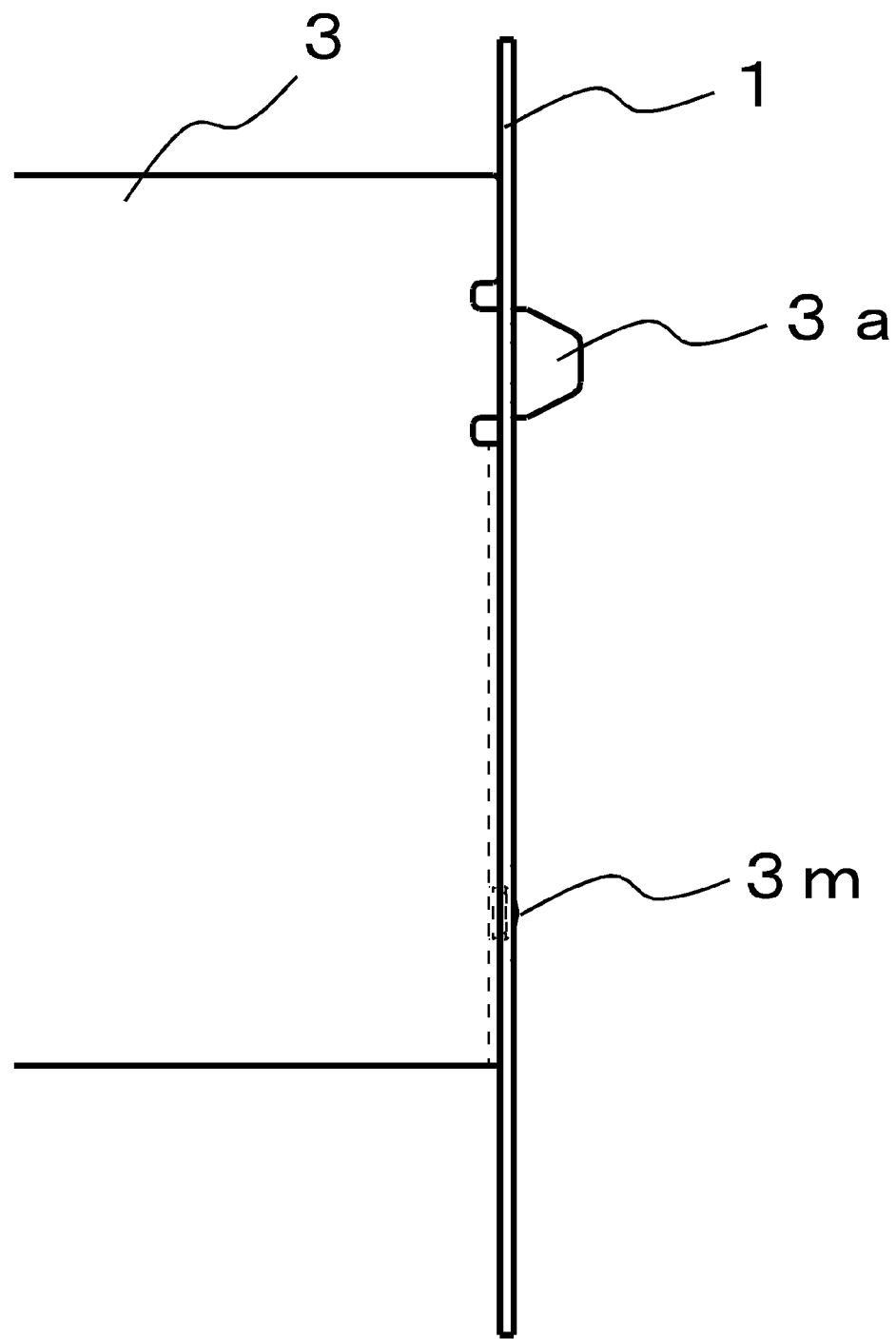
FIG. 6A shows a left side view of an example of performing positioning at a plurality of locations.
Figure 6B:
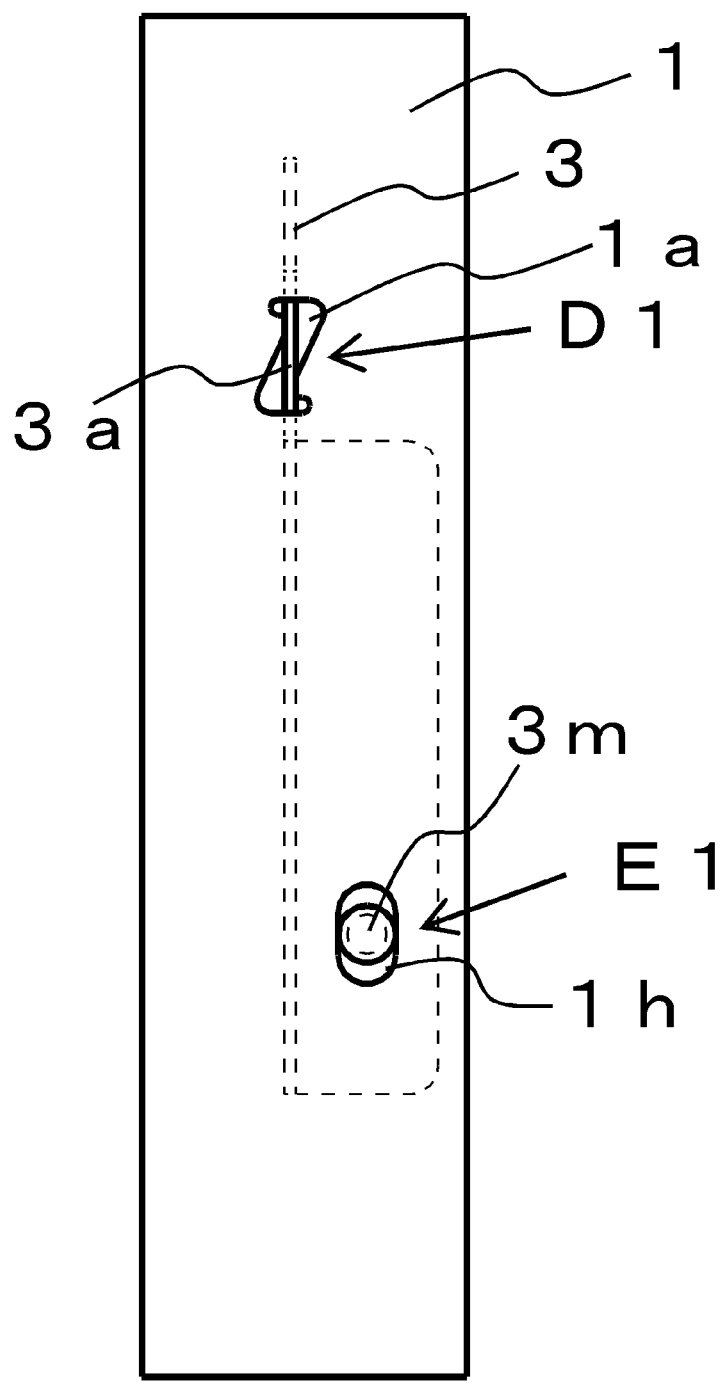
FIG. 6B shows diagrams depicting an example of performing positioning by the D1 portion and the positioning mechanism E1.
Figure 6C:
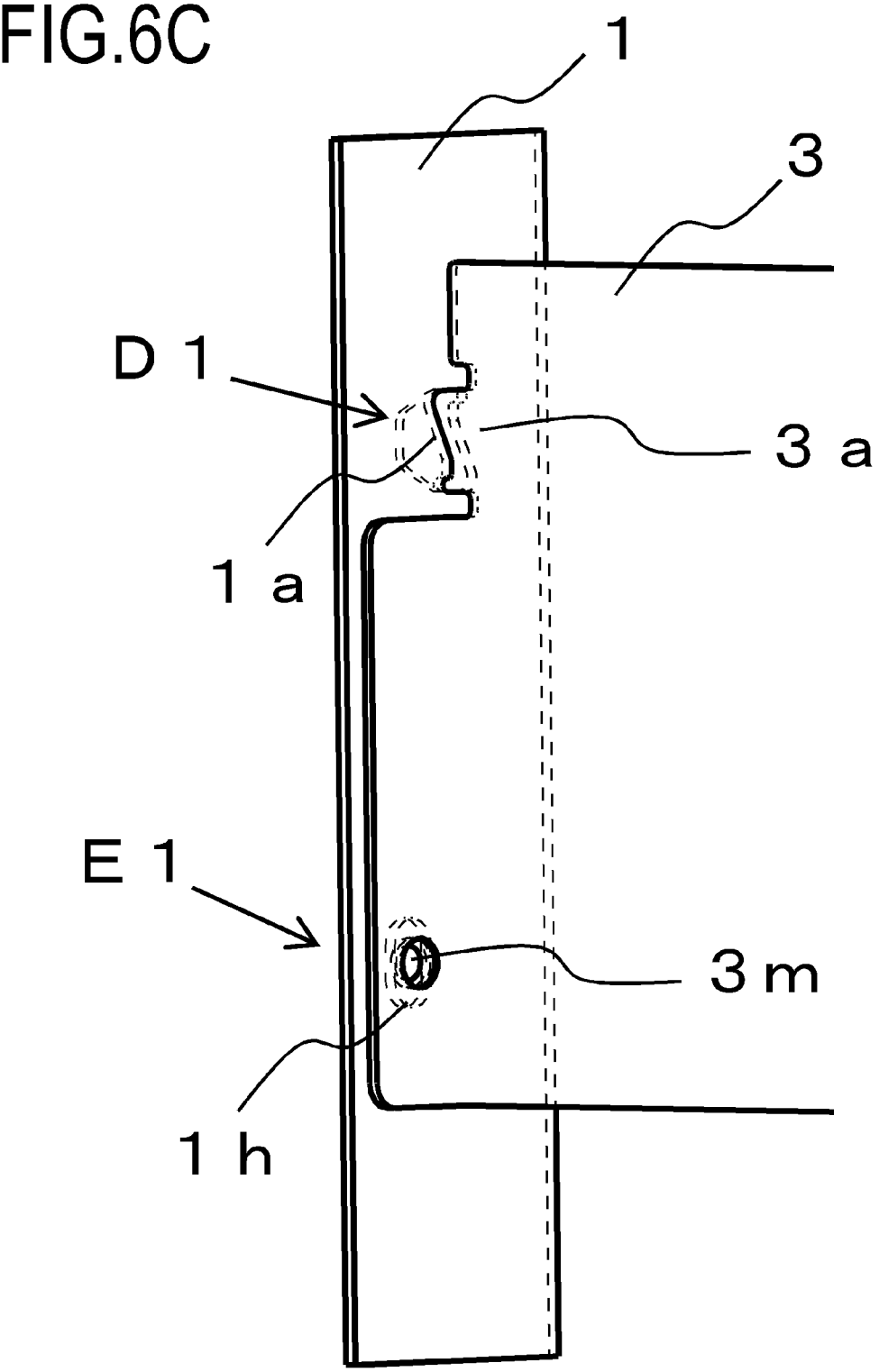
FIG. 6C shows a perspective view when the left side plate is seen from the stay member side.

FIGS. 6A to 6C illustrate an example of performing positioning by the D1 portion and the positioning mechanism E1 using the long hole 1h. FIG. 6B illustrates the D1 portion and the positioning mechanism E1, FIG. 6A is a left side view of FIG. 6B, and FIG. 6C is a perspective view when the left side plate 1 is seen from the stay member 3 side.

The positioning mechanism E1, using the long hole 1h, is a positioning mechanism configured to position two sheet metal parts by interfitting the long hole which is disposed in one of the two sheet metal parts and of which long axis is in the longitudinal direction, with a convex portion disposed in the other sheet metal part.

In this example, the positioning mechanism E1 is constituted by the long hole 1h disposed in the left side plate 1, and the convex portion 3m disposed in the stay member 3.

Figure 6D:
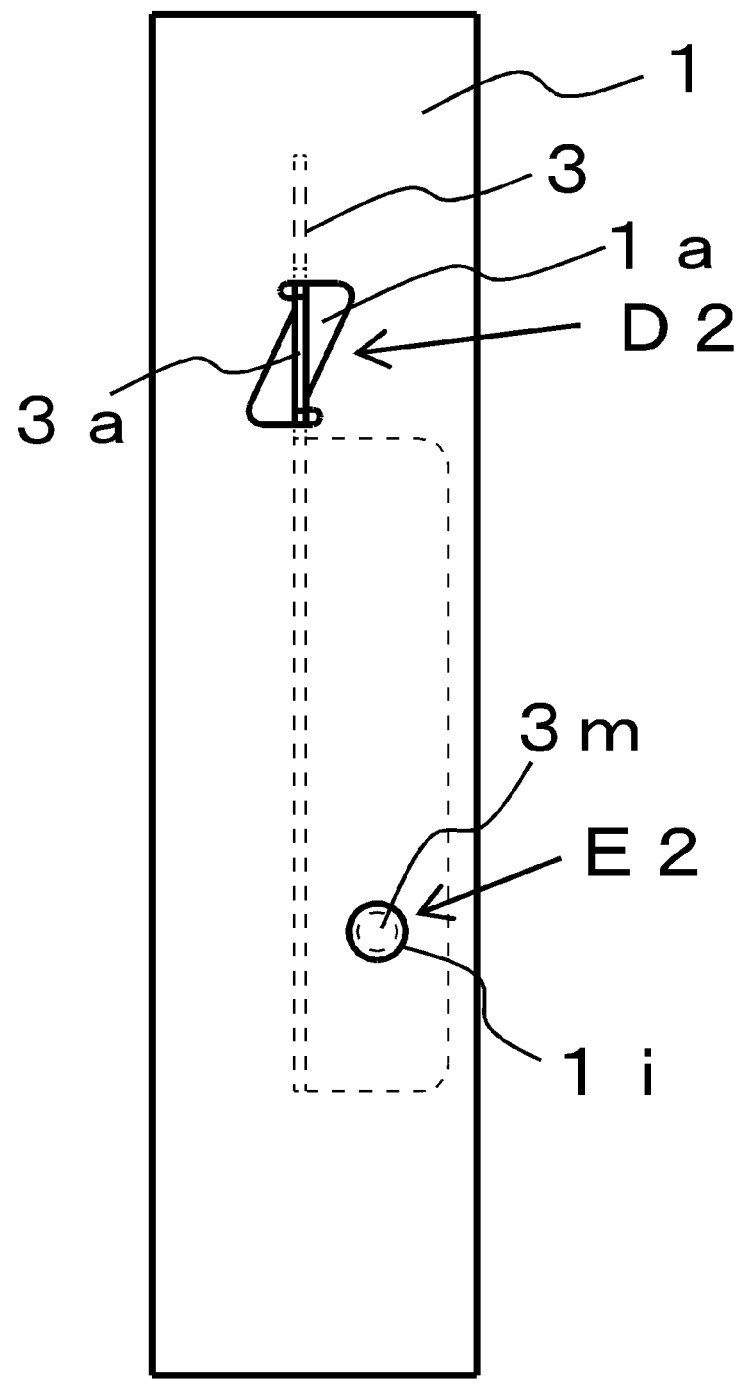
FIG. 6D shows diagrams depicting an example of performing positioning by the D2 portion and the positioning mechanism E2 using the round hole.

FIG. 6D illustrates an example of performing positioning by the D2 portion and a positioning mechanism E2 using the round hole 1i.

The positioning mechanism E2 using the round hole 1i is a positioning mechanism configured to position two sheet metal parts by interfitting the round hole disposed in one of the two sheet metal parts, with a convex portion disposed in the other sheet metal part.

In this example, the positioning mechanism E2 is constituted by the round hole 1i disposed in the left side plate 1, and the convex portion 3m disposed in the stay member 3.

In this example, the shape of the hole 1a is approximately Z-shaped, and the shape of the protruding portion 3a is a shape of which width in the longitudinal direction gradually decreases toward the tip 3b, but the present invention is not limited to this.

In other words, all that is required is that the side 1b and the side 1e, which position the two sheet metal parts by contacting the protruding portion 3a, are disposed in shifted locations in the longitudinal direction.

Figure 9:
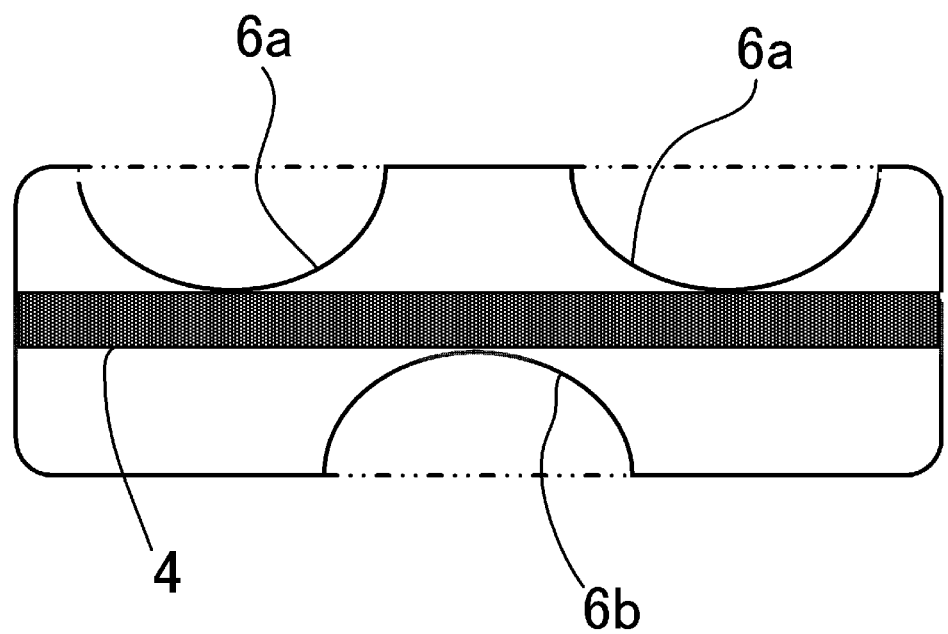
FIG. 9 is a diagram depicting a positioning mechanism according to a comparative example.

Now a difference of a positioning structure of this example from that of a comparative example will be described. FIG. 9 illustrates a positioning structure according to the comparative example. The positioning structure of the comparative example is a structure of holding the protruding portion 4 by three bulging portions (6a, 6b) in the hole, and the space between the protruding portion and the hole is set as small. Therefore if the protruding portion is inserted diagonally into the hole, the sheet metal parts interfere with each other, and the protruding portion becomes stuck, which in some cases makes it impossible to insert the protruding portion into the hole.

In the case of this example, on the other hand, the side 1b and the side 1e used for positioning are disposed at shifted locations in the longitudinal direction. Further, the above-mentioned first edge and the second edge allow the movement of the protruding portion 3a in the opposite directions to the direction in which movement is restricted by the side 1b and the direction in which movement is restricted by the side 1e, until the insertion of the protruding portion 3a completes. Therefore the flexibility of the orientation of the protruding portion 3a during insertion into the hole 1a is greater than the positioning structure of the comparative example.

Thereby even if the position of the stay member 3, which is temporarily held by the assembly jig deviates due to the dispersion of the dimensions of the parts and installation looseness, the two sheet metal parts can be easily positioned.

Example 2

Example 2 will be described next. A difference of this example from Example 1 is that the tip shape of the protruding portion 3a of Example 1 is changed. Here composing elements that are different from Example 1 will be described, and description of composing elements that are the same as Example 1 will be omitted.

FIGS. 7A to 7D are diagrams depicting the positioning of the protruding portion 3a and the hole 1a according to this example.

Figure 7A:
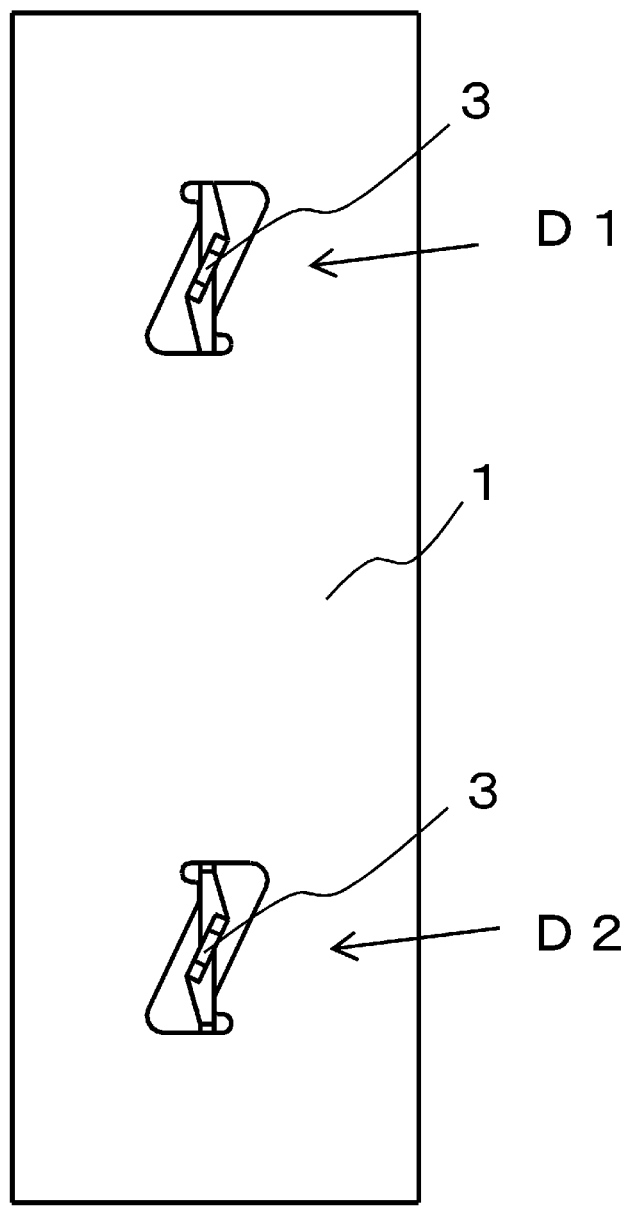
FIG. 7A shows diagrams depicting positioning using a protruding portion and a hole according to Example 2.
Figure 7C:
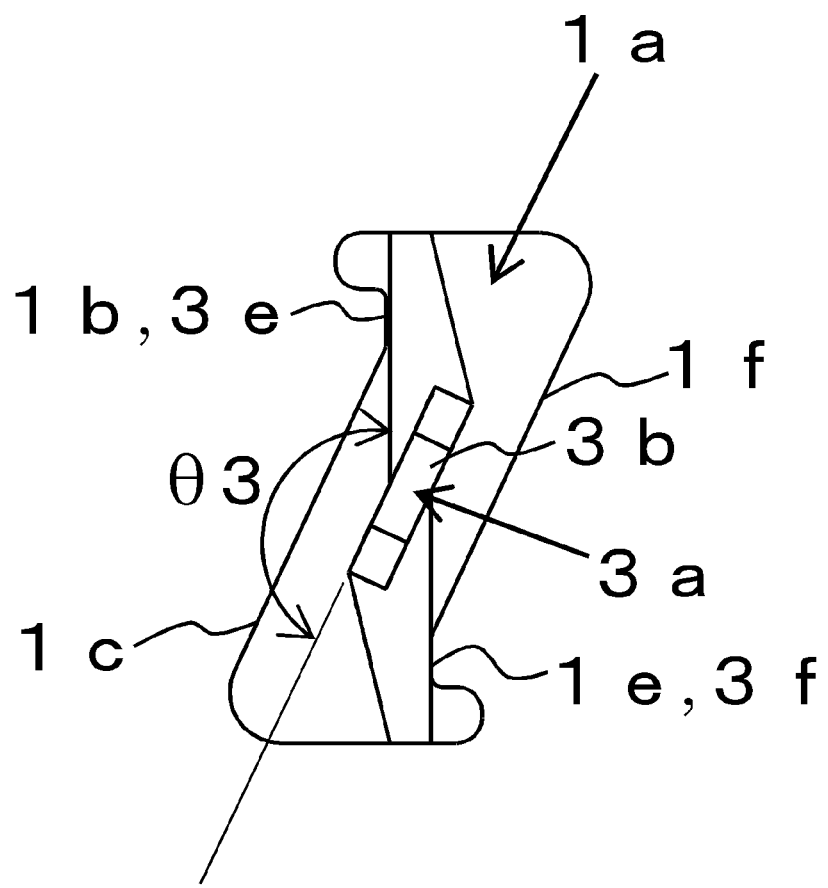
FIG. 7C shows an enlarged view of D1 portion illustrated in FIG. 7A.
Figure 7D:
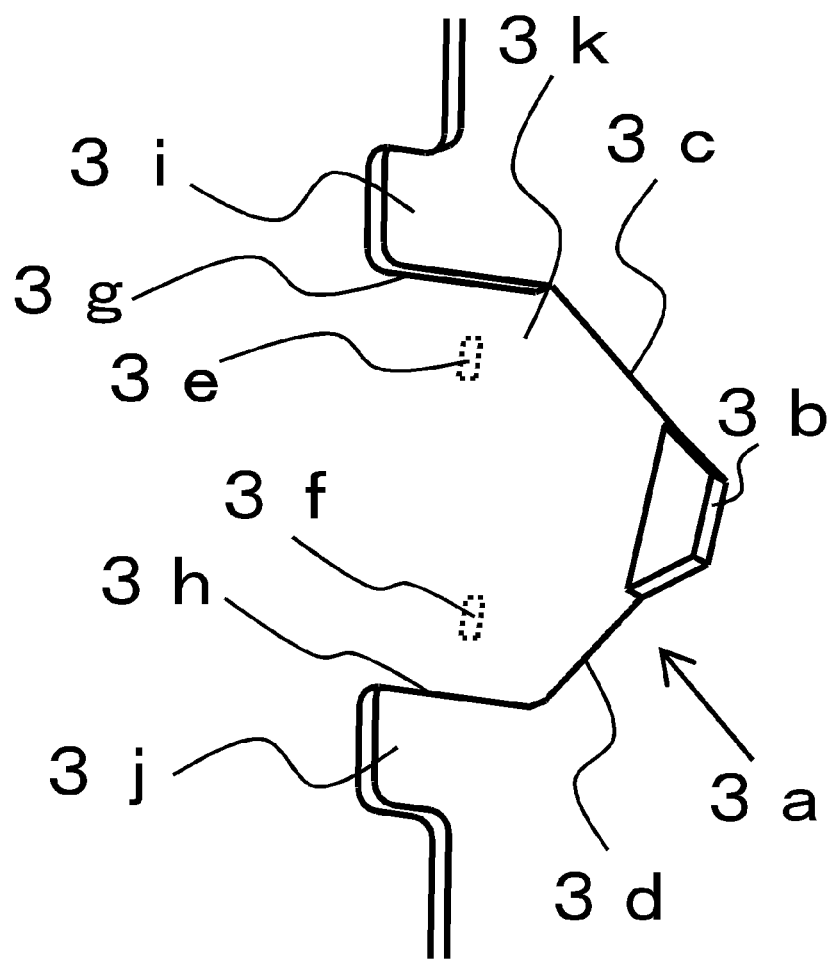
FIG. 7D shows a perspective view of the protruding portion according to Example 2.

FIG. 7A illustrates the D1 portion and the D2 portion, FIG. 7C is an enlarged view of the D1 portion, and FIG. 7B is a left side view of FIG. 7C. FIG. 7D is a perspective view of the protruding portion 3a.

The protruding portion 3a of this example has a shape in which the tip portion is twisted with respect to the portions used for positioning (contact portions 3e and 3f, and interfitting portions 3g and 3h).

In this example, the angle formed by the vertical line, including the contact portion 3e and the tip 3b, is θ3, as illustrated in FIG. 7C.

As illustrated in FIG. 7D, the portion that is used for the positioning with the hole 1a is not twisted, hence the left side plate 1 and the stay member 3 can be positioned in this example, as in Example 1.

In this example, θ1=θ2=θ3=155°, and the tip 3b in the positioned state is located in a position along the side 1c or the side 1f.

It is preferable that θ1, θ2 and θ3 are the same angle, but they may be different angles.

Figure 8A:
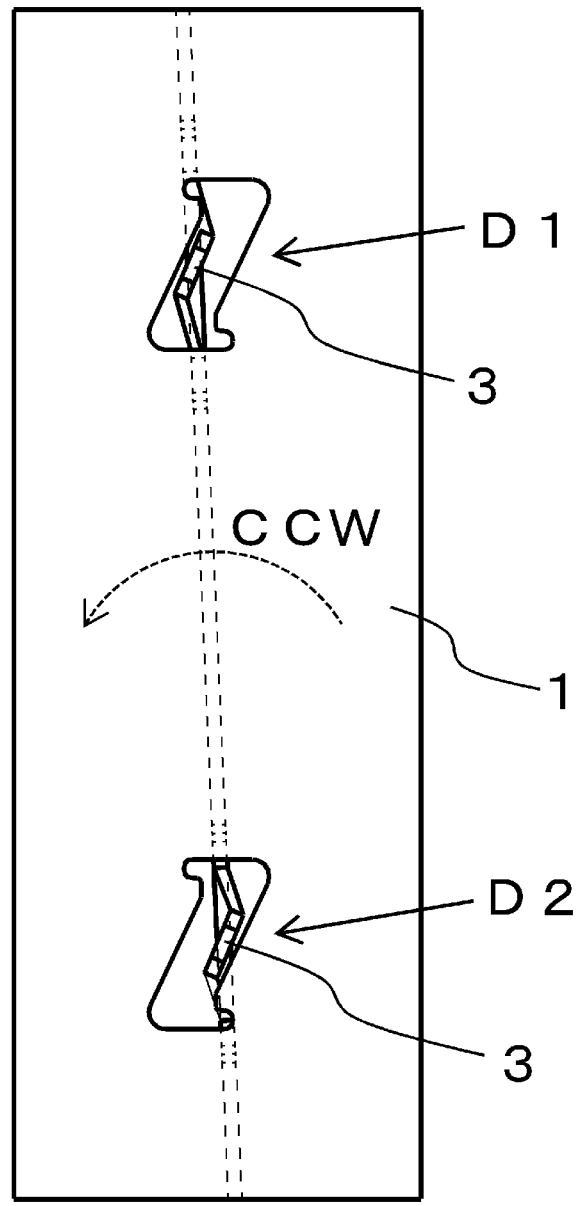
FIG. 8A shows diagrams depicting the positioning operation according to Example 2.
Figure 8C:
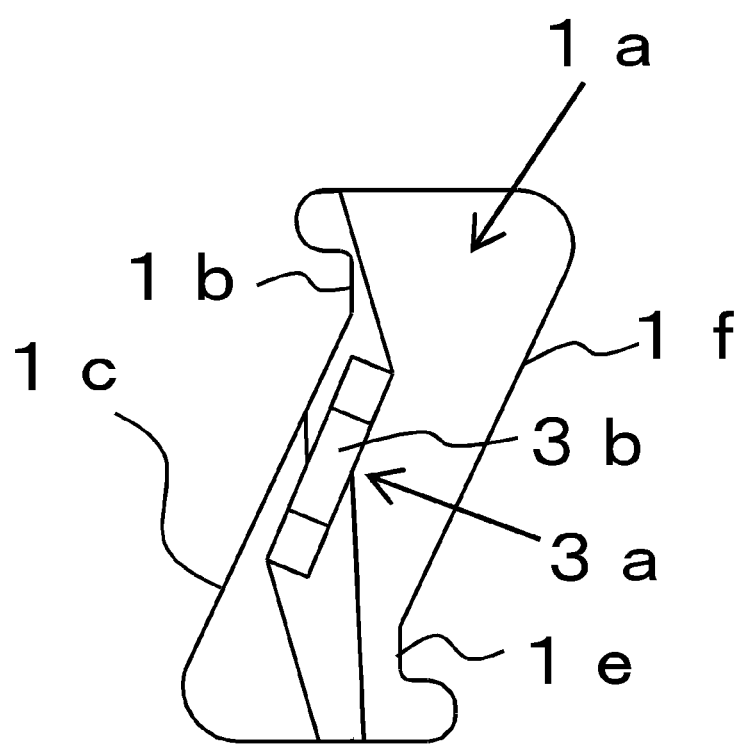
FIG. 8C shows an enlarged view of D1 portion illustrated in FIG. 8A.

FIGS. 8A to 8C are diagrams depicting an operation to position the left side plate 1 and the stay member 3 in a state where the stay member 3 deviates. FIG. 8A illustrates the D1 portion and the D2 portion, FIG. 8B is a left side view of FIG. 8A, and FIG. 8C is an enlarged view of the D1 portion.

In the D1 portion and the D2 portion, the position of the stay member 3 which is temporarily held by the assembly jig may disperse due to the dispersion of dimensions of the parts and installation looseness. In such a case, the stay member 3 may be inserted into the hole 1a in a deviated state in the CCW (counterclockwise) direction, as illustrated in FIG. 8A.

An operation to position the left side plate 1 and the stay member 3 in this state will be described next. In the following description, the D1 portion is described, but the insertion operation may be performed in the deviated state also in the D2 portion, as in the D1 portion, hence the description of the D2 portion will be omitted.

First when the protruding portion 3a is inserted into the hole 1a, as illustrated in FIG. 8B, the protruding portion 3a, which deviates to the left in the plate thickness direction with respect to the hole 1a, is interrupted by the side 1b of the hole 1a, and cannot be inserted in this state, as illustrated in FIG. 8C. Therefore as in Example 1, the protruding portion 3a in the state of FIG. 8C is inclined clockwise by a predetermined angle, and the tip of the protruding portion 3a is inserted into the hole 1a in this state. Then the side 3c, which inclines such that the width in the longitudinal direction from the positioning location of the protruding portion 3a and the left side plate 1 to the tip of the protruding portion 3a gradually decreases, and is also twisted, contacts with the above-mentioned first edge including the side 1c of the hole 1a. If the protruding portion 3a is further inserted into the hole 1a in this state, the portion corresponding to the side 1c of the first edge plays the role of the directional guide to the positioning location, whereby the side 3c is guided to the positioned state along the side 1c. The D2 portion is also positioned in the same manner at this time.

The same assembly can be used for the case when the protruding portion 3a is inserted in the state of deviating from the hole 1a in the CW (clockwise) direction. In other words, the protruding portion 3a is inclined counterclockwise by a predetermined angle, and the tip of the protruding portion 3a is inserted into the hole 1a in this state. Then the side 3d, which is the inclined side forming a pair with the above-mentioned side 3c, contacts the above-mentioned second edge including the side if of the hole 1a.

If the protruding portion 3a is further inserted into the hole 1a in this state, the portion corresponding to the side if of the second edge plays the role of the directional guide to the positioning location as in the above-mentioned case, whereby the side 3d is guided to the positioned state along the side 1f. The D2 portion is also guided to the positioned state at this time.

Therefore even if the position of the stay member 3 which is temporarily held by the assembly jig deviates in the CW direction or CCW direction during assembly, the protruding portion 3a can be guided by the side 1c or the side if and positioned, only if the tip 3b of the protruding portion 3a does not deviate from the hole 1a in the D1 portion and the D2 portion.

As described above, according to this example, the tip portion of the protruding portion 3a of Example 1 is twisted.

Thereby even if the position of the stay member 3 which is temporarily held by the assembly jig deviates due to the dispersion of the dimensions of the parts and installation looseness and the two sheet metal components deviates in the CW direction or CCW direction during positioning, the sheet metal parts can be more easily positioned.

As a result, in this example as well, assembly can be easily performed without increasing the size of the parts.

Each example described above is merely for exemplifying an embodiment of the present invention, and may be changed in various ways without departing from the essence of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133461, filed on Jul. 7, 2017, which is hereby incorporated by reference herein in its entirety.

The invention claimed is:

1. A part positioning mechanism comprising:
   a first sheet metal part including an opening, a first convex portion, and a second convex portion, each of the first convex portion and the second convex portion protrude from an edge of the opening; and
   a second sheet metal part including a protruding portion constituted by a part of the second sheet metal part, the protruding portion having a first contact portion and a second contact portion, the part positioning mechanism being configured to position the first sheet metal part and the second sheet metal part by inserting the protruding portion into the opening formed in the first sheet metal part,
   wherein, in a state in which the protruding portion is inserted into the opening and positioning the first sheet metal part and the second sheet metal part,
   (i) the first convex portion and the second convex portion position the protruding portion by sandwiching the protruding portion in a plate thickness direction, which is a direction of the plate thickness of the second sheet metal part,
   (ii) the first contact portion contacts the first convex portion and the second contact portion contacts the second convex portion on the opposite side to the side of the first contact portion, the first contact portion and the second contact portion being disposed with a gap in an orthogonal direction which intersects orthogonally with the plate thickness direction and an insertion direction in which the protruding portion is inserted into the opening, and
   wherein, in a such state that both of sides of the protruding portion respectively contact the edge of the opening, the protruding portion is positioned using the first convex portion and the second convex portion, the portion of the sides contacting the edge of the opening being at each of ends of the protruding portion in the orthogonal direction and extending in the plate thickness direction.

2. The part positioning mechanism according to claim 1, wherein the shape of the opening is approximately Z-shaped when viewed in the insertion direction.

3. The part positioning mechanism according to claim 1, wherein the protruding portion further includes a pair of inclined sides of which width in the orthogonal direction gradually decreases from a positioning location with the first sheet metal part to a tip portion in the insertion direction, and
   wherein, in a state of the protruding portion being inserted into the opening and being in progress to complete of the insertion, the pair of inclined sides move to the positioning location with the first sheet metal part.

4. The part positioning mechanism according to claim 3, wherein the distance between the first contact portion and the second contact portion in the orthogonal direction is longer than the width of the tip portion in the orthogonal direction.

5. The part positioning mechanism according to claim 1, wherein the opening has a space which allows the protruding portion to be completely inserted into the opening in a state of being inclined by a predetermined angle with respect to one of the plate thickness direction and the orthogonal direction.

6. The part positioning mechanism according to claim 1, wherein when the protruding portion is positioned by being sandwiched by the first convex portion and the second convex portion in the plate thickness direction, both ends of the protruding portion in the orthogonal direction are interfitted between one edge side of the opening in the orthogonal direction and the other edge side of the opening in the orthogonal direction, such that the protruding portion is positioned also in the orthogonal direction.

7. A part positioning mechanism, comprising:
the part positioning mechanism according to claim 1;
wherein the first sheet metal part and the second sheet metal part are positioned at a plurality of locations.

8. A part positioning mechanism, comprising:
the part positioning mechanism according to claim 1; and
a part positioning mechanism configured to position the first sheet metal part and the second sheet metal part by interfitting a round hole disposed in one of the first sheet metal part and the second sheet metal part, with a convex portion disposed on the other of the first sheet metal part and the second sheet metal part,
wherein the first sheet metal part and the second sheet metal part are positioned at a plurality of locations.

9. A part positioning mechanism, comprising:
the part positioning mechanism according to claim 1; and
a part positioning mechanism configured to position the first sheet metal part and the second sheet metal part by interfitting a long hole which is disposed in one of the first sheet metal part and the second sheet metal part and of which long axis is in the orthogonal direction, with a convex portion disposed on the other of the first sheet metal part and the second sheet metal part,
wherein the first sheet metal part and the second sheet metal part are positioned at a plurality of locations.

10. An image forming apparatus, comprising:
the part positioning mechanism according to claim 1; and
a frame in which a plurality of sheet metal parts is positioned by the part positioning mechanism.

* * * * *